（12) United States Patent
Wang et al.

(10) Patent No.: US 10,959,201 B2
(45) Date of Patent: Mar. 23, 2021

(54) TECHNIQUES FOR INITIAL ACCESS IN WIRELESS SYSTEMS

(71) Applicant: QUALCOMM Incorporated, San Diego, CA (US)

(72) Inventors: Xiao Feng Wang, San Diego, CA (US); Peter Gaal, San Diego, CA (US); Iyab Issam Sakhnini, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/373,416

(22) Filed: Apr. 2, 2019

(65) Prior Publication Data

US 2019/0313357 A1    Oct. 10, 2019

Related U.S. Application Data

(60) Provisional application No. 62/653,472, filed on Apr. 5, 2018.

(51) Int. Cl.
*H04W 56/00* (2009.01)
*H04B 7/185* (2006.01)
(Continued)

(52) U.S. Cl.
CPC ...... *H04W 56/0045* (2013.01); *H04B 7/1851* (2013.01); *H04W 48/04* (2013.01); *H04W 72/046* (2013.01); *H04W 76/10* (2018.02)

(58) Field of Classification Search
None
See application file for complete search history.

(56) References Cited

U.S. PATENT DOCUMENTS 5,640,166 A     6/1997  Siwiak
5,661,724 A  *  8/1997  Chennakeshu .... H04B 7/18534
                                                                370/324
(Continued)

FOREIGN PATENT DOCUMENTS

CN          103346829 B      4/2016

OTHER PUBLICATIONS

International Search Report and Written Opinion—PCT/US2019/025568—ISA/EPO—dated Jun. 14, 2019.
(Continued)

*Primary Examiner* — Anh Vu H Ly
(74) *Attorney, Agent, or Firm* — Linda G. Gunderson; Holland & Hart LLP

(57) ABSTRACT

Methods, systems, devices, and apparatuses for wireless communications are described that support techniques for initial access in wireless systems. Generally, the described techniques provide for communicating satellite information to simplify initial access procedures. A wireless communications system may signal relevant information (e.g., Doppler information or propagation delay information) associated with communications through a satellite to mobile terminals (e.g., user equipment (UEs)). The mobile terminals may utilize the relevant information to generate an uplink transmission (e.g., a random access message or an initial access message) that compensates for the Doppler shift and propagation delay that may be experienced by communications between the mobile terminals and the satellite.

27 Claims, 15 Drawing Sheets

(51) Int. Cl.
*H04W 76/10* (2018.01)
*H04W 72/04* (2009.01)
*H04W 48/04* (2009.01)

(56) References Cited

U.S. PATENT DOCUMENTS

| | | | |
|---|---|---|---|
| 6,307,503 B1 | 10/2001 | Liu | |
| 6,317,077 B1* | 11/2001 | Soleimani | G01S 5/12 342/357.77 |
| 6,725,034 B1* | 4/2004 | Diris | H04B 7/1855 455/12.1 |
| 6,816,705 B1* | 11/2004 | Quan | H04B 7/1855 342/357.21 |
| 10,084,535 B1* | 9/2018 | Speidel | H04B 7/18508 |
| 2009/0161599 A1* | 6/2009 | Haartsen | H04W 74/0891 370/326 |
| 2010/0331032 A1* | 12/2010 | Lipka | H04W 56/0035 455/509 |
| 2014/0256323 A1* | 9/2014 | Edge | H04W 64/00 455/436 |
| 2016/0173188 A1* | 6/2016 | Uchino | H04B 7/18513 370/316 |
| 2016/0259061 A1* | 9/2016 | Carter | G01S 19/05 |
| 2017/0299725 A1* | 10/2017 | Bitra | G01S 19/23 |
| 2017/0347340 A1* | 11/2017 | Haley | H04W 72/042 |
| 2018/0006710 A1* | 1/2018 | Buer | H04B 7/18521 |
| 2018/0077617 A1* | 3/2018 | Xue | H04W 48/16 |
| 2018/0241464 A1* | 8/2018 | Michaels | H04B 7/0617 |
| 2018/0254825 A1* | 9/2018 | Speidel | H04W 56/0035 |
| 2019/0104549 A1* | 4/2019 | Deng | H04B 7/0617 |
| 2019/0260462 A1* | 8/2019 | Axmon | H04B 7/18523 |
| 2019/0342845 A1* | 11/2019 | Laselva | H04L 1/1812 |
| 2019/0394770 A1* | 12/2019 | Wang | H04B 7/185 |
| 2020/0076544 A1* | 3/2020 | Lin | H04B 7/195 |

OTHER PUBLICATIONS

Zte et al., "Considerations on Random Access in NTN" 3GPP Draft; R1-1801830 Considerations on Random Access in NTN, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 14, 2018 (Feb. 14, 2018), pp. 1-3, XP051396726, Retrieved from the Internet: URL: http://www.3gpp.org/ftp/tsg_ran/WG1_RL1/TSGR1_92/Docs/ [retrieved on Feb. 14, 2018].

* cited by examiner

TECHNIQUES FOR INITIAL ACCESS IN WIRELESS SYSTEMS

CROSS REFERENCES

The present application for patent claims the benefit of U.S. Provisional Patent Application No. 62/653,472 by WANG et al., entitled "Techniques For Initial Access In Wireless Systems," filed Apr. 5, 2018, assigned to the assignee hereof, and expressly incorporated by reference.

BACKGROUND

The following relates generally to wireless communications, and more specifically to techniques for initial access in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems (e.g., non-terrestrial wireless networks (NTNs)) may utilize satellites and high-altitude platforms as relay devices between ground base stations and ground gateways. In NTNs, the round trip delay (RTD) (e.g., or propagation delay) of wireless transmissions may be very large compared to the RTD of terrestrial network transmissions (e.g., an RTD of over 500 ms for geo-stationary satellites). Further, the Doppler shift experienced by transmissions in NTNs (e.g., communications with non-geostationary satellites) may be orders of magnitude greater than the Doppler shift commonly experienced by transmissions in terrestrial networks due to base station movement (e.g., a 500 kHz Doppler shift for a transmission using a carrier frequency of 20 GHz). In some cases, terminals (e.g., UEs) in an NTN may not be equipped with a global positioning system (GPS) that may be utilized to compensate for RTD and Doppler shift.

SUMMARY

The described techniques relate to improved methods, systems, devices, and apparatuses that support techniques for initial access in wireless systems. Generally, the described techniques provide for communicating satellite information to simplify initial access procedures between a ground gateway (e.g., a base station) and a ground terminal (e.g., a user equipment (UE)). A wireless communications system may signal relevant information (e.g., satellite velocity and satellite location) to terminals (e.g., UEs), which may reduce the complexity of compensating for the propagation delay or Doppler effects in non-terrestrial wireless networks (NTNs) including those that do not utilize or support a global positioning system (GPS). Reducing the complexity of compensating for the propagation delay and the Doppler shift may reduce the time and the complexity of an initial access procedure (e.g., a physical random access channel (PRACH) procedure) between a base station and a UE, which may result in a more efficient initial access procedure. The signaled information may be maintained at a database, which may be accessible by a UE in communication with a base station via a satellite, or may be signaled directly to the UE (e.g., via system information). As discussed herein, the term "satellite" may include high-altitude platforms, space stations, aircraft, or any orbital or suborbital device capable of performing wireless communications (e.g., with a ground terminal or ground gateway).

A method of wireless communications is described. The method may include identifying propagation delay information associated with wireless communications between a gateway and a UE in an NTN, where the propagation delay information is identified based on a distance between a satellite in communication with the gateway and the UE and a geographical area associated with a transmission beam from the satellite and transmitting, to one or more devices of the NTN, an indication of the propagation delay information.

An apparatus for wireless communications is described. The apparatus may include a processor, memory in electronic communication with the processor, and instructions stored in the memory. The instructions may be executable by the processor to cause the apparatus to identify propagation delay information associated with wireless communications between a gateway and a UE in an NTN, where the propagation delay information is identified based on a distance between a satellite in communication with the gateway and the UE and a geographical area associated with a transmission beam from the satellite and transmit, to one or more devices of the NTN, an indication of the propagation delay information.

Another apparatus for wireless communications is described. The apparatus may include means for identifying propagation delay information associated with wireless communications between a gateway and a UE in an NTN, where the propagation delay information is identified based on a distance between a satellite in communication with the gateway and the UE and a geographical area associated with a transmission beam from the satellite and transmitting, to one or more devices of the NTN, an indication of the propagation delay information.

A non-transitory computer-readable medium storing code for wireless communications is described. The code may include instructions executable by a processor to identify propagation delay information associated with wireless communications between a gateway and a UE in an NTN, where the propagation delay information is identified based on a distance between a satellite in communication with the gateway and the UE and a geographical area associated with a transmission beam from the satellite and transmit, to one or more devices of the NTN, an indication of the propagation delay information.

Some examples of the method, apparatuses, and non-transitory computer-readable medium described herein may further include operations, features, means, or instructions for determining the distance between the satellite and the geographical area associated with the transmission beam with respect to a center of the geographical area.

Some examples of the method, apparatuses, and non-transitory computer-readable medium described herein may further include operations, features, means, or instructions for periodically updating the distance between the satellite and the geographical area associated with the transmission beam according to an updating periodicity, where the indication of the propagation delay information may be transmitted according to the updating periodicity.

In some examples of the method, apparatuses, and non-transitory computer-readable medium described herein, transmitting the indication of the propagation delay information may include operations, features, means, or instructions for transmitting at least one of a one way distance between the satellite and a center of the geographical area associated with the transmission beam, a round trip distance between the gateway and the satellite, an estimated round trip time between the UE and the gateway, an estimated round trip time between the satellite and the gateway, or a combination thereof.

Some examples of the method, apparatuses, and non-transitory computer-readable medium described herein may further include operations, features, means, or instructions for receiving an initial access message from the UE, where the initial access message may be time adjusted based on the propagation delay information.

Some examples of the method, apparatuses, and non-transitory computer-readable medium described herein may further include operations, features, means, or instructions for identifying Doppler information associated with the satellite, and transmitting, by the satellite, an indication of the Doppler information, where the received initial access message may be frequency adjusted based on the Doppler information.

Some examples of the method, apparatuses, and non-transitory computer-readable medium described herein may further include operations, features, means, or instructions for determining a transmission frequency based on the Doppler information, and transmitting a downlink signal according to the transmission frequency, where the downlink signal includes the indication of the Doppler information.

Some examples of the method, apparatuses, and non-transitory computer-readable medium described herein may further include operations, features, means, or instructions for transmitting the indication of the Doppler information to a network node for maintaining a database of satellite information and transmission beam information associated with wireless communications via the satellite.

Some examples of the method, apparatuses, and non-transitory computer-readable medium described herein may further include operations, features, means, or instructions for broadcasting, by the satellite, the database to a set of devices in the NTN.

In some examples of the method, apparatuses, and non-transitory computer-readable medium described herein, transmitting the indication of the Doppler information may include operations, features, means, or instructions for transmitting at least one of a velocity of the satellite, a difference between a transmission frequency used for transmitting the indication of the Doppler information and a nominal transmission frequency, or a combination thereof.

In some examples of the method, apparatuses, and non-transitory computer-readable medium described herein, the indication of the Doppler information may be conveyed via one or more system information blocks (SIBs).

Some examples of the method, apparatuses, and non-transitory computer-readable medium described herein may further include operations, features, means, or instructions for transmitting the initial access message to the gateway.

A method of wireless communications is described. The method may include identifying, by a UE in an NTN, propagation delay information associated with wireless communications between a gateway in the NTN and the UE, where the propagation delay information is based on a distance between a satellite in communication with the gateway and the UE and a geographical area associated with a transmission beam from the satellite, determining a timing adjustment for transmission of an initial access message based on the propagation delay information, and transmitting the initial access message to the satellite, where the initial access message is time adjusted according to the timing adjustment.

An apparatus for wireless communications is described. The apparatus may include a processor, memory in electronic communication with the processor, and instructions stored in the memory. The instructions may be executable by the processor to cause the apparatus to identify, by a UE in an NTN, propagation delay information associated with wireless communications between a gateway in the NTN and the UE, where the propagation delay information is based on a distance between a satellite in communication with the gateway and the UE and a geographical area associated with a transmission beam from the satellite, determine a timing adjustment for transmission of an initial access message based on the propagation delay information, and transmit the initial access message to the satellite, where the initial access message is time adjusted according to the timing adjustment.

Another apparatus for wireless communications is described. The apparatus may include means for identifying, by a UE in an NTN, propagation delay information associated with wireless communications between a gateway in the NTN and the UE, where the propagation delay information is based on a distance between a satellite in communication with the gateway and the UE and a geographical area associated with a transmission beam from the satellite, determining a timing adjustment for transmission of an initial access message based on the propagation delay information, and transmitting the initial access message to the satellite, where the initial access message is time adjusted according to the timing adjustment.

A non-transitory computer-readable medium storing code for wireless communications is described. The code may include instructions executable by a processor to identify, by a UE in an NTN, propagation delay information associated with wireless communications between a gateway in the NTN and the UE, where the propagation delay information is based on a distance between a satellite in communication with the gateway and the UE and a geographical area associated with a transmission beam from the satellite, determine a timing adjustment for transmission of an initial access message based on the propagation delay information, and transmit the initial access message to the satellite, where the initial access message is time adjusted according to the timing adjustment.

Some examples of the method, apparatuses, and non-transitory computer-readable medium described herein may further include operations, features, means, or instructions for receiving an indication of Doppler information from the satellite, where the indication may be received via one or more system information blocks (SIBs). In some examples, the apparatus may further include a receiver, where the apparatus may include instructions for receiving, by the receiver, an indication of Doppler information from the satellite, where the indication may be received via one or more SIBs.

In some examples of the method, apparatuses, and non-transitory computer-readable medium described herein, identifying the propagation delay information may include operations, features, means, or instructions for accessing a database of satellite information and transmission information based on a cell identifier (ID) of the satellite, where the cell ID corresponds to the transmission beam.

Some examples of the method, apparatuses, and non-transitory computer-readable medium described herein may further include operations, features, means, or instructions for receiving an indicator of the cell ID from the satellite. In some cases of the apparatus, the apparatus may receive the indicator of the cell ID using a receiver or transceiver.

Some examples of the method, apparatuses, and non-transitory computer-readable medium described herein may further include operations, features, means, or instructions for receiving a broadcast message from the satellite or a network node of the NTN, where the broadcast message includes the database. In some cases of the apparatus, the apparatus may receive the broadcast message using a receiver or transceiver.

In some examples of the method, apparatuses, and non-transitory computer-readable medium described herein, the satellite information includes at least one of a one way distance between the satellite and a center of the geographical area associated with the transmission beam, a round trip distance between the gateway and the satellite, an estimated round trip time between the UE and the gateway, an estimated round trip time between the satellite and the gateway, or a combination thereof.

In some examples of the method, apparatuses, and non-transitory computer-readable medium described herein, the Doppler information includes at least one of a velocity of the satellite, a difference between a transmission frequency used for transmitting the indication of the Doppler information and a nominal transmission frequency, or a combination thereof.

In some examples of the method, apparatuses, and non-transitory computer-readable medium described herein, determining the timing adjustment may include operations, features, means, or instructions for performing synchronization with a downlink signal that includes the indication of the Doppler information.

Some examples of the method, apparatuses, and non-transitory computer-readable medium described herein may further include operations, features, means, or instructions for receiving, from the gateway, a random access response message via the satellite in response to the initial access message.

DETAILED DESCRIPTION

Various described techniques provide for identifying propagation delay information and Doppler information associated with communications between a satellite and a user equipment (UE) (e.g., a terminal) in communication with a ground gateway (e.g., a base station) within a non-terrestrial wireless network (NTN). The techniques also provide for compensation of the identified propagation delay and Doppler information in subsequent transmissions. In some examples, propagation delay information may be identified based on a distance between a satellite in communications with a gateway and the UE and a geographical area associated with a transmission beam from the satellite. For example, the propagation delay information may be a one way distance between the satellite and a center of the geographical area associated with the transmission beam, a round trip distance between the gateway and the satellite, an estimated round trip delay between the UE and the gateway, or a combination thereof. The Doppler information may include a velocity of the satellite, a difference between a transmission frequency used for transmitting the indication of the Doppler information and a nominal transmission frequency, or a combination thereof.

In some cases, the satellite may compensate for the Doppler information in a downlink transmission to the UE. The downlink transmission may include the propagation delay information In such a case, the satellite may transmit the downlink transmission at a frequency that is different from a nominal downlink frequency. The UE may then transmit an uplink transmission with an adjusted frequency based at least in part on the received Doppler information.

In other cases, the satellite may not compensate for the Doppler information in a downlink transmission to the UE. Instead, the satellite may transmit the downlink transmission, which may include the propagation delay information, to the UE at a nominal downlink frequency. Due to Doppler shift, the downlink transmission may arrive at the UE at a frequency that is different from the nominal downlink frequency. Accordingly, the UE may compensate for the Doppler shift by transmitting an uplink transmission at a frequency that is different from a nominal uplink frequency in a manner that compensates for the Doppler shift experienced by the downlink transmission.

In both cases, the UE may adjust the transmission timing of the uplink transmission based at least in part on the received propagation delay information.

Aspects of the disclosure are initially described in the context of wireless communications systems. Aspects are then illustrated and described with reference to a process flow. Aspects of the disclosure are further illustrated by and described with reference to apparatus diagrams, system diagrams, and flowcharts that relate to techniques for initial access in wireless systems.

Figure 1:
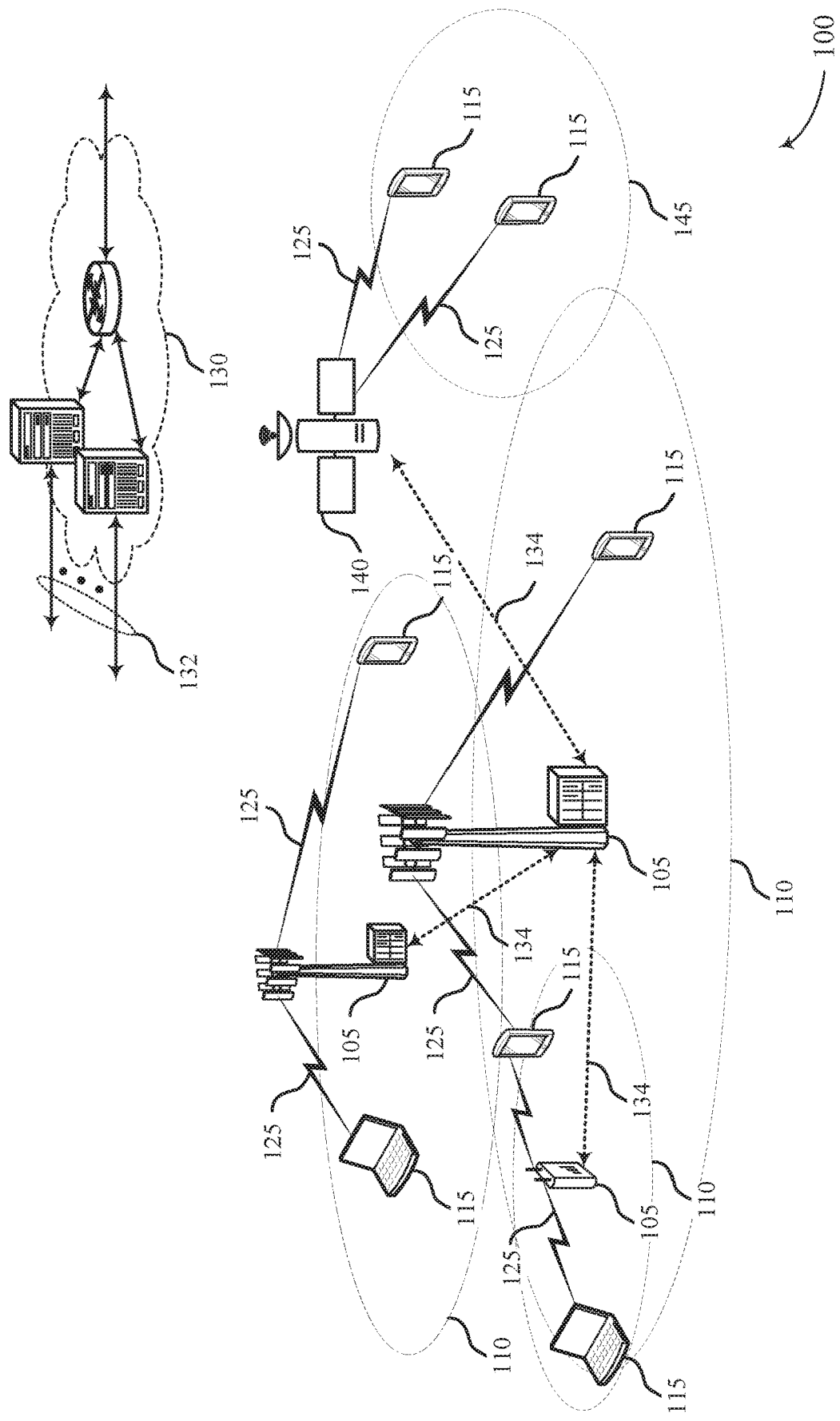
FIGS. 1 and 2 illustrate examples of wireless communications systems in accordance with aspects of the present disclosure.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, a ground gateway, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Base stations 105 (or ground gateways) may wirelessly communicate with UEs 115 via one or more satellites 140 (e.g., or high-altitude platforms). The satellites 140 may relay communications between base stations 105 and UEs 115. Each satellite 140 may be associated with a geographical area in which communications with various UEs 115 is supported, which may be referred to as a beam footprint 145. Each satellite 140 may provide communication coverage for a respective beam footprint 145 via communication links 125, and communication links 125 between a satellite 140 and a UE 115 may utilize one or more carriers. Communication links 125 shown in wireless communications system 100 may include uplink transmissions from a UE 115 to a satellite 140, or downlink transmissions from a satellite 140 to a UE 115. Downlink transmissions may also be called forward link transmissions while uplink transmissions may also be called reverse link transmissions. A beam footprint 145 may be an area associated with a transmission beam of a satellite 140. In some cases, satellite 140 may be a high-altitude platform, a space station, an aircraft, or any orbital or suborbital device capable of performing wireless communications (e.g., with a UE 115 or base station 105).

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). Base stations 105 may communicate with satellites 140 wirelessly over backhaul links 134 (e.g., via an X2 or other interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands which may be in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base stations 105 may utilize satellites 140 to relay communications to UEs 115. Due to the mobility of the satellites 140 and the distance from the satellites 140 to the UEs 115, the communications may experience Doppler shifts and propagation delay. In some cases, UEs may not utilize a global positioning system (GPS) which may be used to determine information for compensating for the Doppler shifts and propagation delays.

In some examples, a satellite 140 may determine propagation delay information and transmit the propagation delay information to a UE 115. The propagation delay information may be identified based on a distance between the satellite 140 in communications with a base station 105 or gateway 105 (e.g., a ground gateway) and the UE 115 and a beam footprint 145 associated with a transmission beam from the satellite 140. For example, the propagation delay information may be a one way distance between the satellite 140 and a center of the beam footprint 145 associated with the transmission beam, a round trip distance between the gateway 105 and the satellite 140, an estimated round trip delay between the UE 115 and the gateway 105, or a combination thereof. The Doppler information may include a velocity of the satellite 140, a difference between a transmission frequency used for transmitting the indication of the Doppler information and a nominal transmission frequency, or a combination thereof.

In some cases, the satellite 140 may compensate for the Doppler information in a downlink transmission to the UE 115. In such a case, the satellite 140 may transmit the downlink transmission at a frequency that is different from a nominal downlink frequency. The UE 115 may then transmit an uplink transmission with an adjusted frequency based at least in part on the received Doppler information and adjusted timing based on the propagation delay information.

In other cases, the satellite 140 may not compensate for the Doppler information in a downlink transmission to the UE 115. Due to Doppler shift, the downlink transmission may arrive at the UE 115 at a frequency that is different from the nominal downlink frequency. Accordingly, the UE 115 may compensate for the Doppler shift by transmitting an uplink transmission at a frequency that is different from a nominal uplink frequency and time adjusted based on the propagation delay information.

Figure 2:
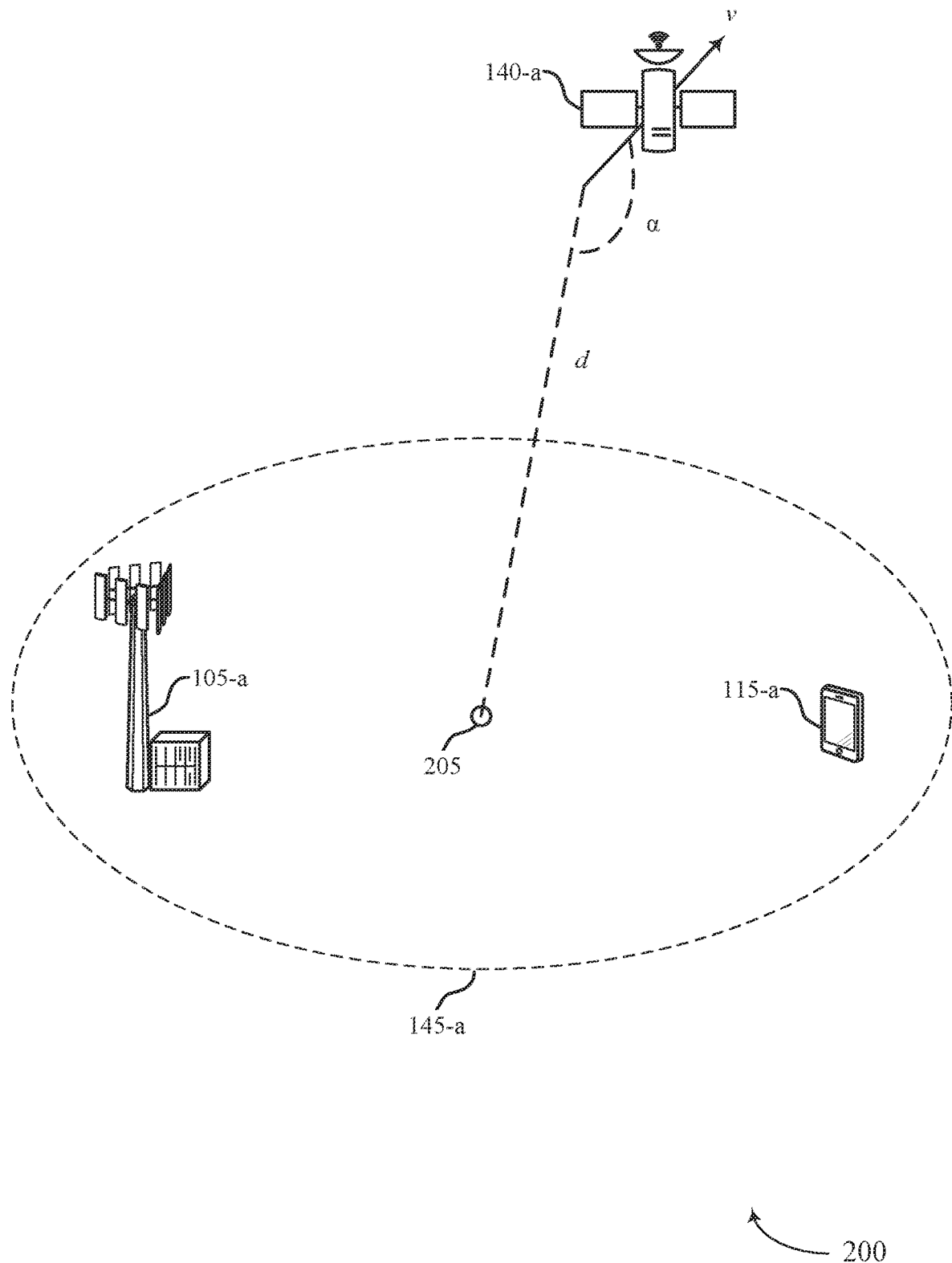

FIG. 2 illustrates an example of a wireless communications system 200 in accordance with aspects of the present disclosure. In some examples, wireless communications system 200 may implement aspects of wireless communications system 100. Wireless communications system 200 may be an NTN, which may include satellite 140-a that is located in Earth's orbit. Satellite 140-a may relay communications between base stations (e.g., gateway 105-a) and mobile terminals (e.g., UE 115-a) that are located on Earth. The geographical area associated with a transmission beam of satellite 140-a may be called a beam footprint 145-a and UE 115-a may communicate with satellite 140-a when UE 115-a is located within beam footprint 145-a.

In some examples, satellite 140-a may determine propagation delay information associated with the communications between satellite 140-a, UE 115-b, and gateway 105-a. In some cases, the propagation delay information may be the distance d from satellite 140-a to the center of the beam footprint 205 associated with beam footprint 145-a. In other cases, the propagation delay information may be the distance 2d, which may correspond to the round trip distance between gateway 105-a and satellite 140-a. Additionally or alternatively, the propagation delay information may be an estimated round trip delay (RTD) or round trip time (RTT) between UE 115-a and gateway 105-a, which may be based at least in part on d and/or 2d. Satellite 140-a may transmit the propagation delay information to UE 115-a, which is located within beam footprint 145-a.

In some cases, satellite 140-a may update and transmit the value of the propagation delay information to UE 115-a at an updating rate. In some cases, the updating rate may be based at least in part on the velocity of satellite 140-a. For example, the velocity of satellite 140-a may result in an RTT variation rate of 50 µs per second. That is, for every second of movement of satellite 140-a, the RTT of communications between satellite 140-a and UE 115-a, for example, may vary by up to 50 µs. In such a case, the average RTT variation rate may be 10 µs per second. In such instances, the satellite 140-a may update the propagation delay information five times every second, resulting is an updating rate of one update every 200 ms.

It should be noted that the distance d may not reflect an exact distance from satellite 140-a to UE 115-a. For example, UE 115-a may be located at the edge of beam footprint 145-a and may be a different distance from satellite 140-a than d. However, such a difference in distance may be insignificant compared to the magnitude of distance d. Thus, the distance d may be a sufficient representation of the distance from the satellite 140-a to UE 115-a.

In some cases, satellite 140-a may not compensate for Doppler shift when transmitting a downlink signal that includes the propagation delay information to UE 115-a. In such a case, UE 115-a may receive the downlink transmission at a frequency $f_d$. UE 115-a may compare $f_d$ to a nominal downlink frequency $f_{dn}$ where $f_{dn}$ may correspond to the frequency at which the downlink transmission was originally transmitted by satellite 140-a (i.e., the frequency of the downlink transmission without the effects of Doppler shift). UE 115-a may then determine the frequency $f_u$ at which an uplink transmission (e.g., a PRACH transmission) may be sent according to Equation (1) below.

$$f_u = f_{un} \times \frac{f_{dn}}{f_d} \tag{1}$$

In Equation (1), $f_{un}$ is a nominal uplink frequency. $f_{un}$ and $f_{dn}$ may be based on oscillating frequencies of free-running local oscillators at UE 115-a. Accordingly, UE 115-a may assume that the values of $f_{un}$ and $f_{dn}$ are accurate. Thus, the difference in value between $f_{dn}$ and $f_d$ may be attributed to the Doppler shift experienced by the downlink transmission, resulting in UE 115-a generating $f_u$ in a manner that compensates for the Doppler shift experienced by the downlink transmission, and, subsequently, by the uplink transmission.

For example, satellite 140-a may transmit the downlink transmission at a frequency of 20 GHz. Due to Doppler shift, the downlink transmission may arrive at UE 115-a at a frequency of 19.5 GHz. In such a case, UE 115-a may compare the received downlink frequency $f_d$ (e.g., 19.5 GHz) to the nominal downlink frequency $f_{dn}$ (e.g., 20 GHz) in order to generate an uplink transmission that compensates for the Doppler shift. The nominal uplink frequency $f_{un}$ at UE 115-a may be 30 GHz; thus, the frequency of the uplink transmission $f_u$ that compensates for Doppler shift may be determined as follows:

$$f_u = f_{un} \times \frac{f_{dn}}{f_d} = 30 \text{ GHz} \times \frac{20 \text{ GHz}}{19.5 \text{ GHz}} = 30.77 \text{ GHz}.$$

UE 115-a may adjust (e.g., advance or delay) the transmission timing of an uplink transmission (e.g., an initial access message) based at least in part on the propagation delay information, thus compensating for the RTD experienced by the uplink transmission.

In some examples, satellite 140-a may compensate for Doppler shift when transmitting a downlink signal including the propagation delay information to UE 115-a. In such a case, satellite 140-a may also transmit the velocity v of satellite 140-a and/or the difference between the transmitted downlink frequency $f_d$ and the nominal downlink frequency $f_{dn}$, $\Delta f$. This information may be updated and transmitted to UE 115-a at an updating rate, which may be based at least in part on the velocity of satellite 140-a.

Satellite 140-a may transmit the downlink transmission at a downlink frequency $f_d$, where $f_d$ may be defined by Equation (2) below.

$$f_d = \frac{f_{dn}}{(1 + v * \cos\alpha/c)} \quad (2)$$

In Equation (2), $\alpha$ is the angle between the vector of velocity v and the vector of distance d, and c is the speed of light. In some cases, $f_d$ may be defined according to Equation (3) below.

$$f_d = f_{dn} + \Delta f \quad (3)$$

In both examples, $f_d$ may be transmitted at a frequency that compensates for the Doppler shift that will be experienced by the downlink transmission. Thus, UE 115-a may receive the downlink transmission at frequency $f_d$, which, after experiencing the expected Doppler shift, may be equal to $f_{dn}$.

After receiving the downlink transmission, UE 115-a may determine the frequency $f_u$ at which an uplink transmission (e.g., a PRACH transmission) may be sent according to:

$$f_u = \frac{f_{un}}{(1 + v * \cos\alpha/c)}.$$

UE 115-a may adjust the transmission timing of the uplink transmission based at least in part on the propagation delay information, thus compensating for the RTD experienced by the uplink transmission.

In some examples, satellite 140-a may transmit the downlink transmissions via a system information block (SIB) (e.g., physical broadcast channel (PBCH) or remaining minimum system information (RMSI)).

In other examples, wireless communications system 200 may maintain a database that contains relevant satellite orbit and beam information (e.g., d, v*cos α/c) for each cell identifier (ID) (e.g., each satellite beam). In some cases, the database may map a cell ID to relevant doppler and/or timing information. The database may be downloaded by UE 115-a or transmitted via a broadcast message or an on-demand message over the NTN. UE 115-a may read the cell ID and the relevant orbit and beam information that correspond to the cell ID. In some examples, the database may be maintained by a network device such as a base station (e.g., base station 105 of FIG. 1) or a node of the core network (e.g., core network 130 of FIG. 1), which may be accessible by the UE 115-a. Here, the UE 115-a may download the database when the UE 115-a is connected to the Internet (e.g., by a base station 105). In this case, the UE 115-a may utilize the downloaded database after the UE 115-a is no longer connected to the Internet (e.g., not within a coverage area of a base station).

Figure 3:
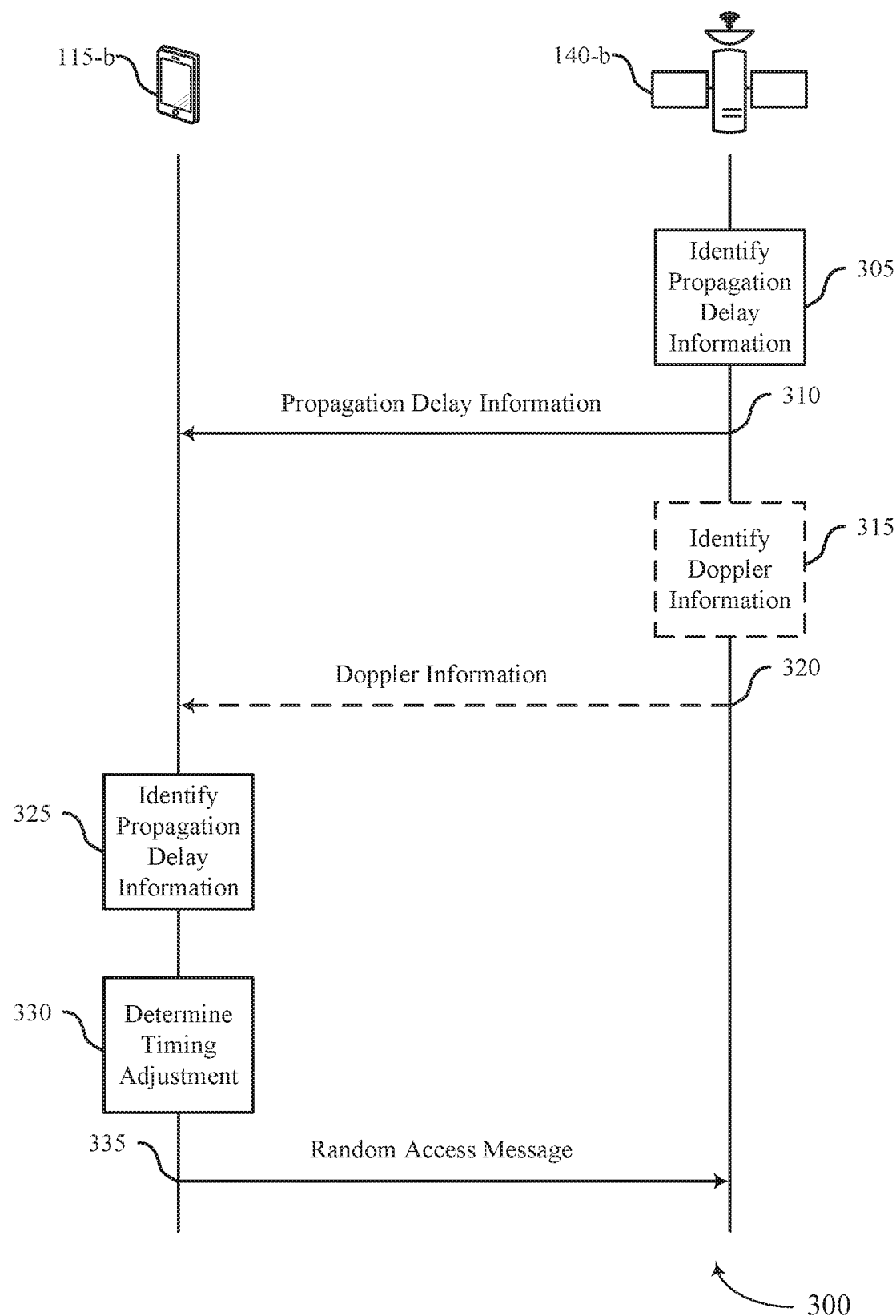
FIG. 3 illustrates an example of a process flow that in accordance with aspects of the present disclosure.

FIG. 3 illustrates an example of a process flow 300 in accordance with aspects of the present disclosure. In some examples, process flow 300 may implement aspects of wireless communication systems as described herein.

At 305, satellite 140-b may identify propagation delay information associated with wireless communications between a gateway and UE 115-b in an NTN. The propagation delay may be identified based at least in part on a distance between satellite 140-b in communication with the gateway and UE 115-b and a geographical area associated with a transmission beam from satellite 140-b. Satellite 140-b may determine the distance between satellite 140-b and the geographical area associated with the transmission beam with respect to a center of the geographical area.

At 310, satellite 140-b may transmit, to UE 115-b, an indication of the propagation delay information. Satellite 140-b may periodically update the distance between satellite 140-b and the geographical area associated with the transmission beam according to an updating periodicity. Accordingly, satellite 140-b may transmit the indication of the propagation delay information according to the updating periodicity. In some cases, satellite 140-b may transmit at least one of a one way distance between satellite 140-b and a center of the geographical area associated with the transmission beam, a round trip distance between the gateway and the satellite, an estimated round time delay between UE 115-b and the gateway or between the satellite 140-b and the gateway, or a combination thereof.

At 315, satellite 140-b may identify Doppler information associated with satellite 140-b. In some cases, satellite 140-b may determine a transmission frequency based at least in part on the Doppler information. The Doppler information associated with satellite 140-b may be one of a velocity of satellite 140-b, a difference between a transmission frequency used for transmitting the indication of the Doppler information and a nominal transmission frequency, or a combination thereof.

At 320, satellite 140-b may transmit, to UE 115-b, an indication of the Doppler information. In some cases, satellite 140-b may transmit a downlink signal according to the transmission frequency determined at 315, wherein the downlink signal comprises the indication of the Doppler information. In some cases, the indication of the Doppler information may be conveyed via one or more SIBs.

In some cases, satellite 140-b may transmit the indication of the Doppler information to a network node for maintaining a database of satellite information and transmission beam information associated with wireless communications via satellite 140-b. In some instances, satellite 140-b may broadcast the database to a set of devices in the NTN. In some other cases, a base station may broadcast the database to a set of devices within a coverage area. Here, the database may include Doppler information associated with more than one satellite 140. For example, the satellite 140-b may be in communication with a base station and transmit the indication of the Doppler information to the base station. A second satellite 140 may also be in communication with the base station and transmit the indication of Doppler information to the base station. Thus, the database may include Doppler information for more than one satellite.

In some cases, at 320, UE 115-b may download the database of satellite information and transmission beam information. For example, if UE 115-b is connected to the Internet (e.g., by a base station), the UE 115-b may download the database.

At 325, UE 115-b may identify propagation delay information associated with wireless communications between a gateway in the NTN and UE 115-b. The propagation delay information may be based at least in part on a distance between satellite 140-b in communication with the gateway and UE 115-b and a geographical area associated with a transmission beam from satellite 140-b.

In some examples, UE 115-b may identify the propagation delay information by accessing a database of satellite information and transmission information based at least in part on a cell ID of satellite 140-b, wherein the cell ID corresponds to the transmission beam. In some cases, UE 115-b may receive, using a receiver or transceiver of the UE 115-b, an indicator of the cell ID from satellite 140-b. In some instances, UE 115-b may receive a broadcast message from satellite 140-b or a network node of the NTN, wherein the broadcast message comprises the database. The satellite information may comprise at least one of a one way distance between satellite 140-b and a center of the geographical area associated with the transmission beam, a round trip distance between the gateway and the satellite, an estimated round trip delay between UE 115-b and the gateway, or a combination thereof.

At 330, UE 115-b may determine a timing adjustment for transmission of a random access message (e.g., an initial access message) based at least in part on the propagation delay information. UE 115-b may perform synchronization with a downlink signal that comprises the indication of the Doppler information.

At 335, UE 115-b may transmit, to satellite 140-b, the random access message. In some cases, the random access message may be time adjusted based at least in part on the propagation delay information. In some examples, the random access message may be frequency adjusted based at least in part on Doppler information received by UE 115-b.

In some examples, satellite 140-b may transmit the random access message to the gateway. UE 115-b may receive, from the gateway, a random access response message via satellite 140-b in response to the random access message.

Figure 4:
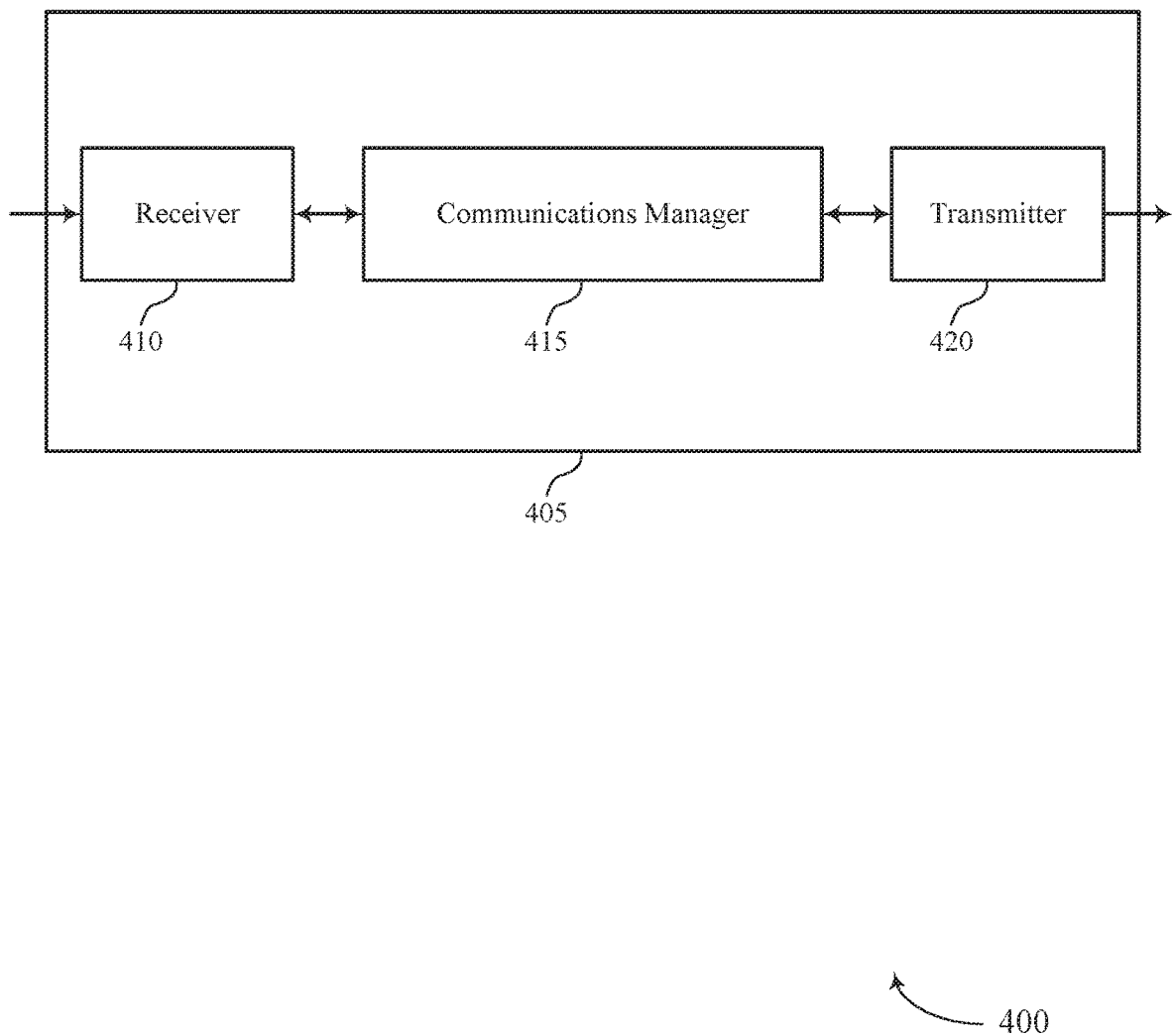
FIGS. 4 through 6 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for initial access in wireless systems). Information may be passed on to other components of the device 405. The receiver 410 may be an example of aspects of the transceiver 720 described with reference to FIG. 7. The receiver 410 may utilize a single antenna or a set of antennas.

The communications manager 415 may identify propagation delay information associated with wireless communications between a gateway in the NTN and a UE, where the propagation delay information may be based on a distance between a satellite in communication with the gateway and the UE and a geographical area associated with a transmission beam from the satellite. Communications manager 415 may determine a timing adjustment for transmission of an initial access message based on the propagation delay information. Communications manager 415 may transmit the initial access message to the satellite, where the initial access message is time adjusted according to the timing adjustment. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some cases, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
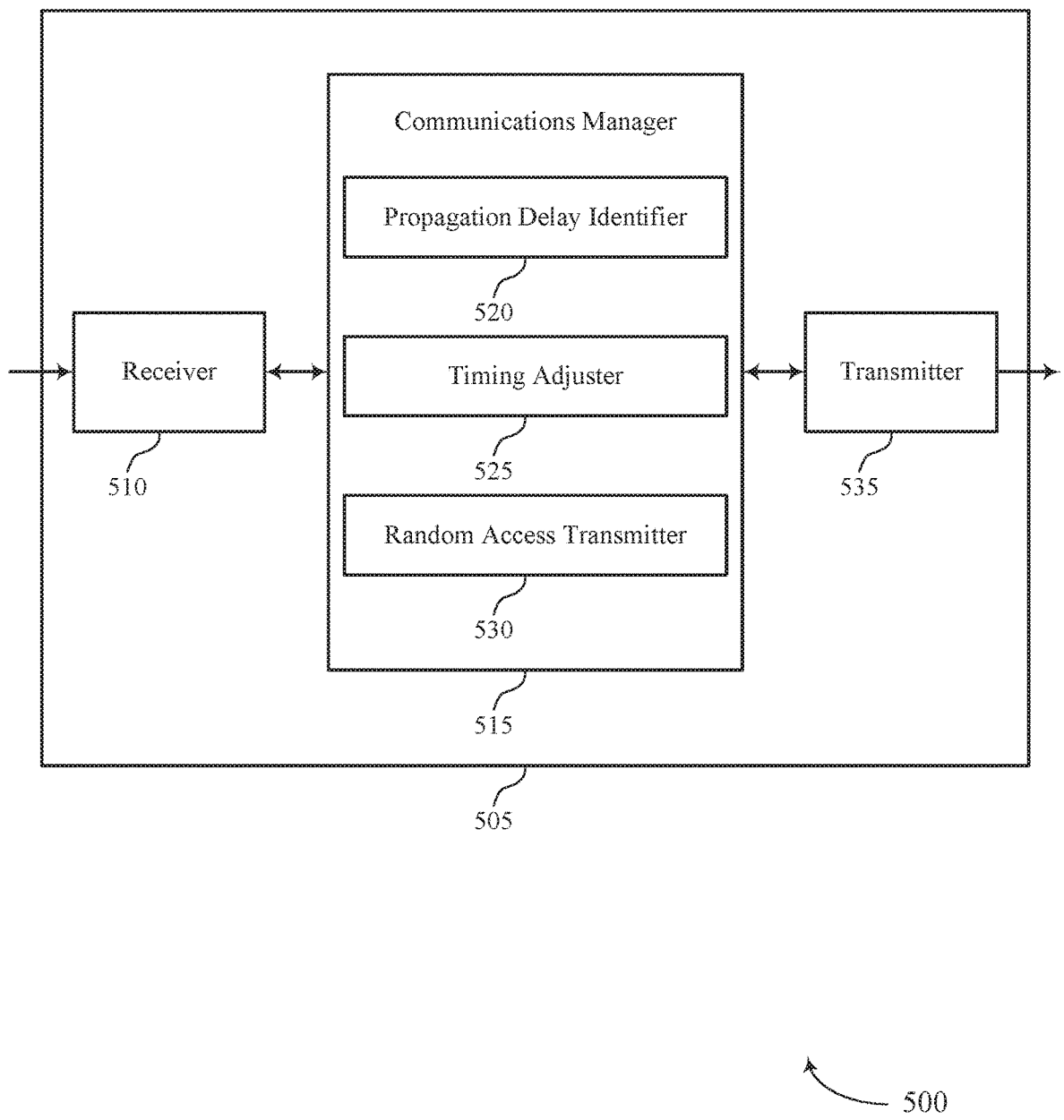

FIG. 5 shows a block diagram 500 of a device 505 in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques for initial access in wireless systems). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a propagation delay identifier 520, a timing adjuster 525, and a random access transmitter 530. The communications manager 515 may be an example of aspects of the communications manager 710 described herein.

The propagation delay identifier 520 may identify propagation delay information associated with wireless communications between a gateway in the NTN and a UE, where the propagation delay information may be based on a distance between a satellite in communication with the gateway and the UE and a geographical area associated with a transmission beam from the satellite.

The timing adjuster 525 may determine a timing adjustment for transmission of an initial access message based on the propagation delay information.

The random access transmitter 530 may transmit the initial access message to the satellite, where the initial access message is time adjusted according to the timing adjustment.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
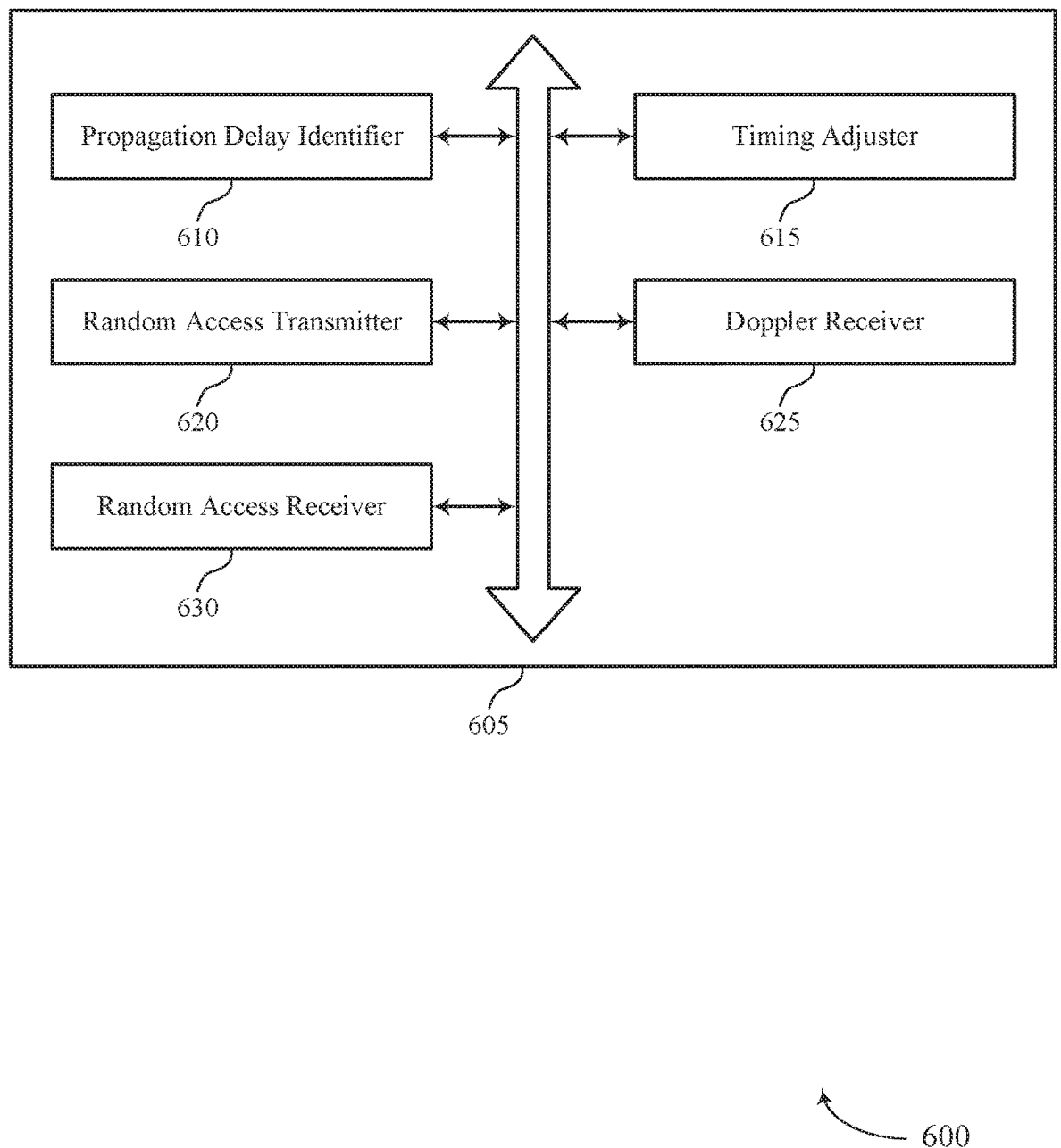

FIG. 6 shows a block diagram 600 of a communications manager 605 in accordance with aspects of the present disclosure. The communications manager 605 may be an example of aspects of a communications manager 415, a communications manager 515, or a communications manager 710 described herein. The communications manager 605 may include a propagation delay identifier 610, a timing adjuster 615, a random access transmitter 620, a doppler receiver 625, and a random access receiver 630. Each of these modules may communicate, directly or indirectly, with one another (e.g., via one or more buses).

The propagation delay identifier 610 may identify propagation delay information associated with wireless communications between a gateway in the NTN and a UE, where the propagation delay information may be based on a distance between a satellite in communication with the gateway and the UE and a geographical area associated with a transmission beam from the satellite.

In some examples, the propagation delay identifier 610 may access a database of satellite information and transmission information based on a cell ID of the satellite, where the cell ID corresponds to the transmission beam. In some cases, the propagation delay identifier 610 may receive, using a receiver or transceiver (e.g., transceiver 720), an indicator of the cell ID from the satellite. In some instances, the propagation delay identifier may receive, using a receiver or transceiver (e.g., transceiver 720), a broadcast message from the satellite or a network node of the NTN, where the broadcast message includes the database. In some aspects, the satellite information includes at least one of a one way distance between the satellite and a center of the geographical area associated with the transmission beam, a round trip distance between the gateway and the satellite, an estimated round trip time between the UE and the gateway, an estimated round trip time between the satellite and the gateway, or a combination thereof.

The timing adjuster 615 may determine a timing adjustment for transmission of an initial access message based on the propagation delay information. In some examples, the timing adjuster 615 may perform synchronization with a downlink signal that includes the indication of the Doppler information.

The random access transmitter 620 may transmit the initial access message to the satellite, where the initial access message is time adjusted according to the timing adjustment.

The Doppler receiver 625 may receive, using a receiver or transceiver (e.g., transceiver 720), an indication of Doppler information from the satellite, where the indication is received via one or SIBs. In some cases, the Doppler information includes at least one of a velocity of the satellite, a difference between a transmission frequency used for transmitting the indication of the Doppler information and a nominal transmission frequency, or a combination thereof.

The random access receiver 630 may receive, from the gateway, an initial access response message via the satellite in response to the initial access message.

Figure 7:
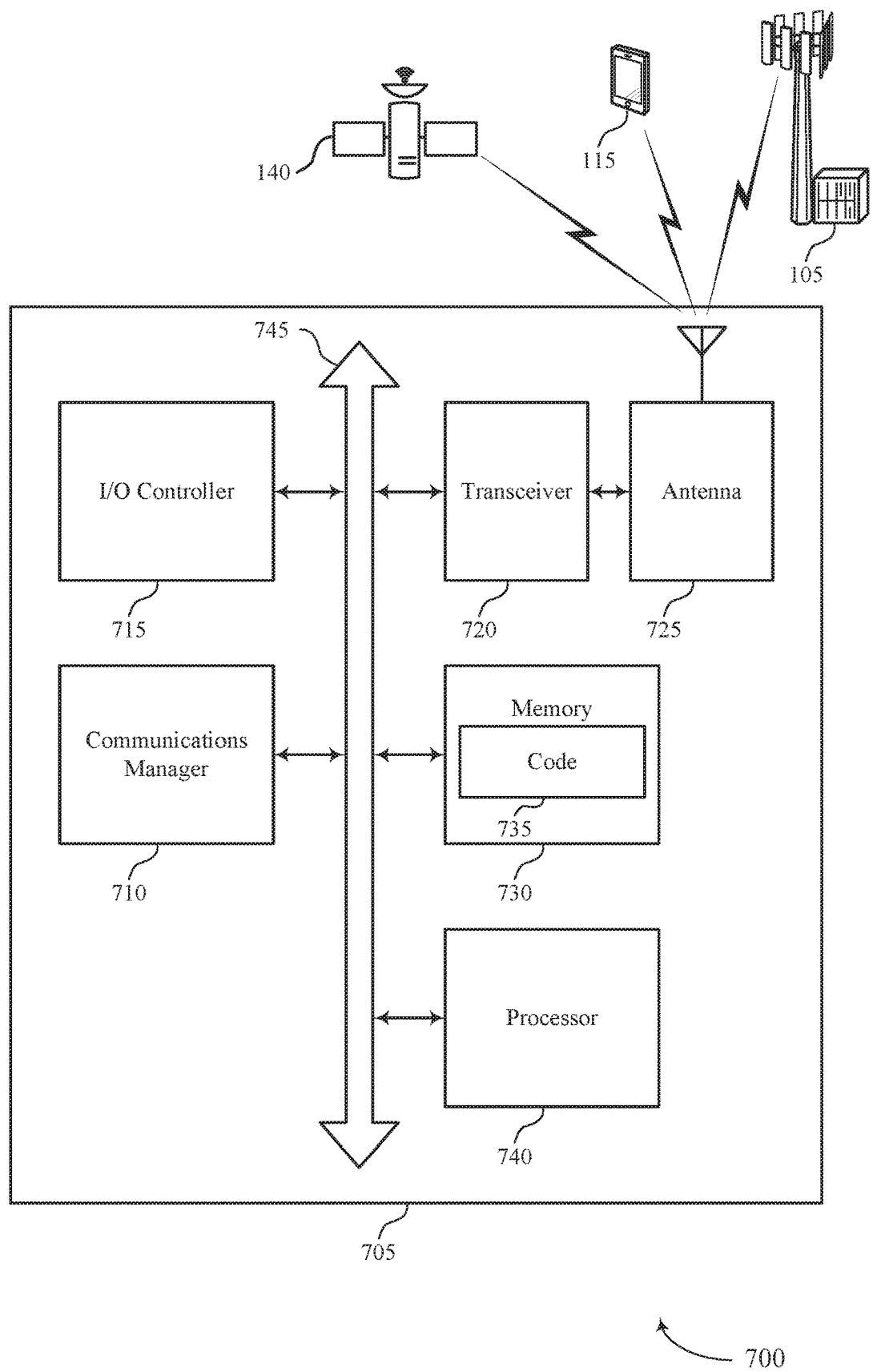
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify propagation delay information associated with wireless communications between a gateway in the NTN and a UE, where the propagation delay information may be based on a distance between a satellite in communication with the gateway and the UE and a geographical area associated with a transmission beam from the satellite. The communications manager 710 may determine a timing adjustment for transmission of an initial access message based on the propagation delay information. The communications manager 710 may transmit the initial access message to the satellite, where the initial access message is time adjusted according to the timing adjustment.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for initial access in wireless systems).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
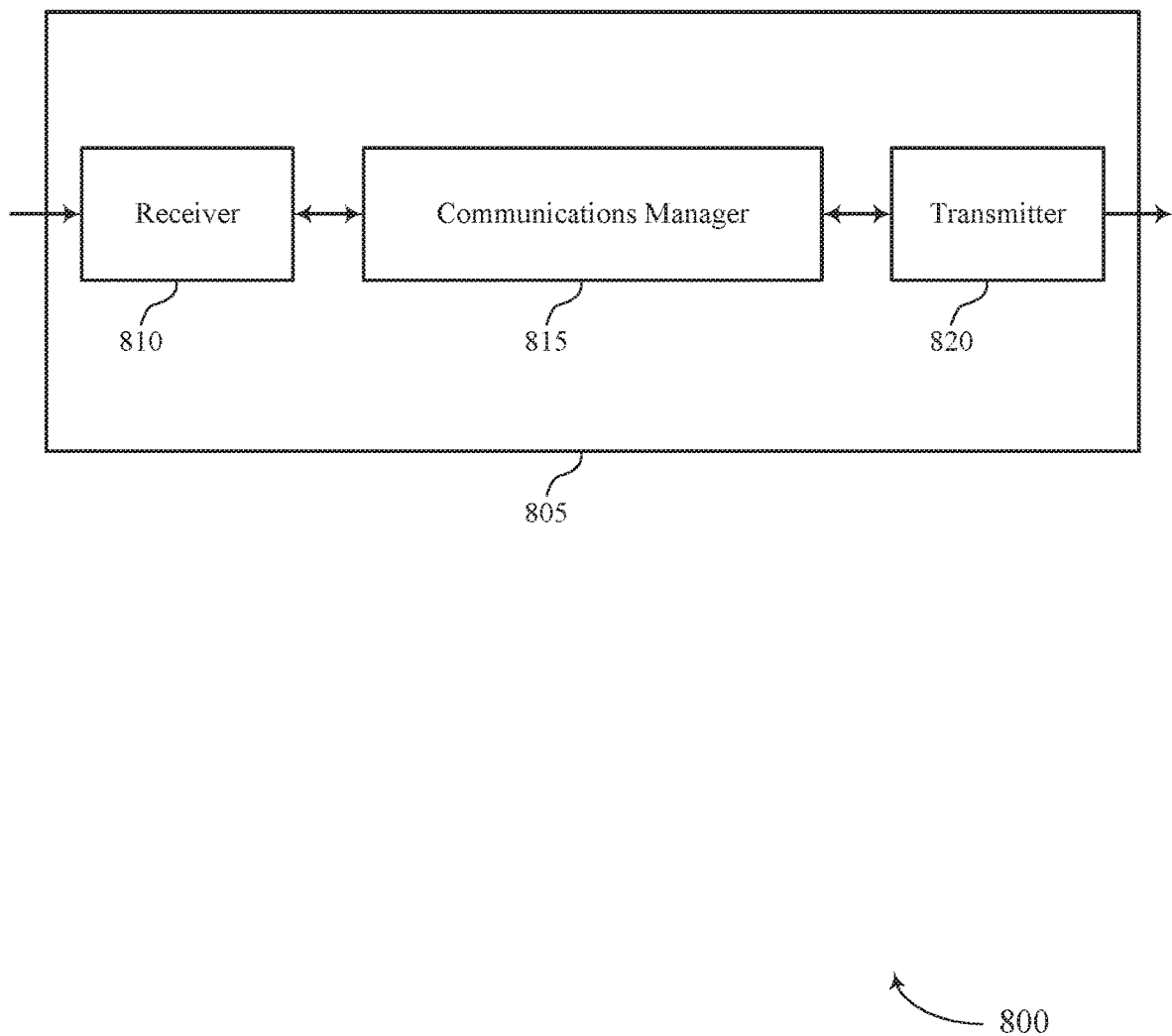
FIGS. 8 through 10 show block diagrams of devices in accordance with aspects of the present disclosure.

FIG. 8 shows a block diagram 800 of a device 805 in accordance with aspects of the present disclosure. The device 805 may be an example of aspects of a relay device such as a satellite 140 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for initial access in wireless systems). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify propagation delay information associated with wireless communications between a gateway and a UE in an NTN, where the propagation delay information may be identified based on a distance between a satellite in communication with the gateway and the UE and a geographical area associated with a transmission beam from the satellite. The communications manager 815 may transmit, to one or more devices of the NTN, an indication of the propagation delay information. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some cases, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
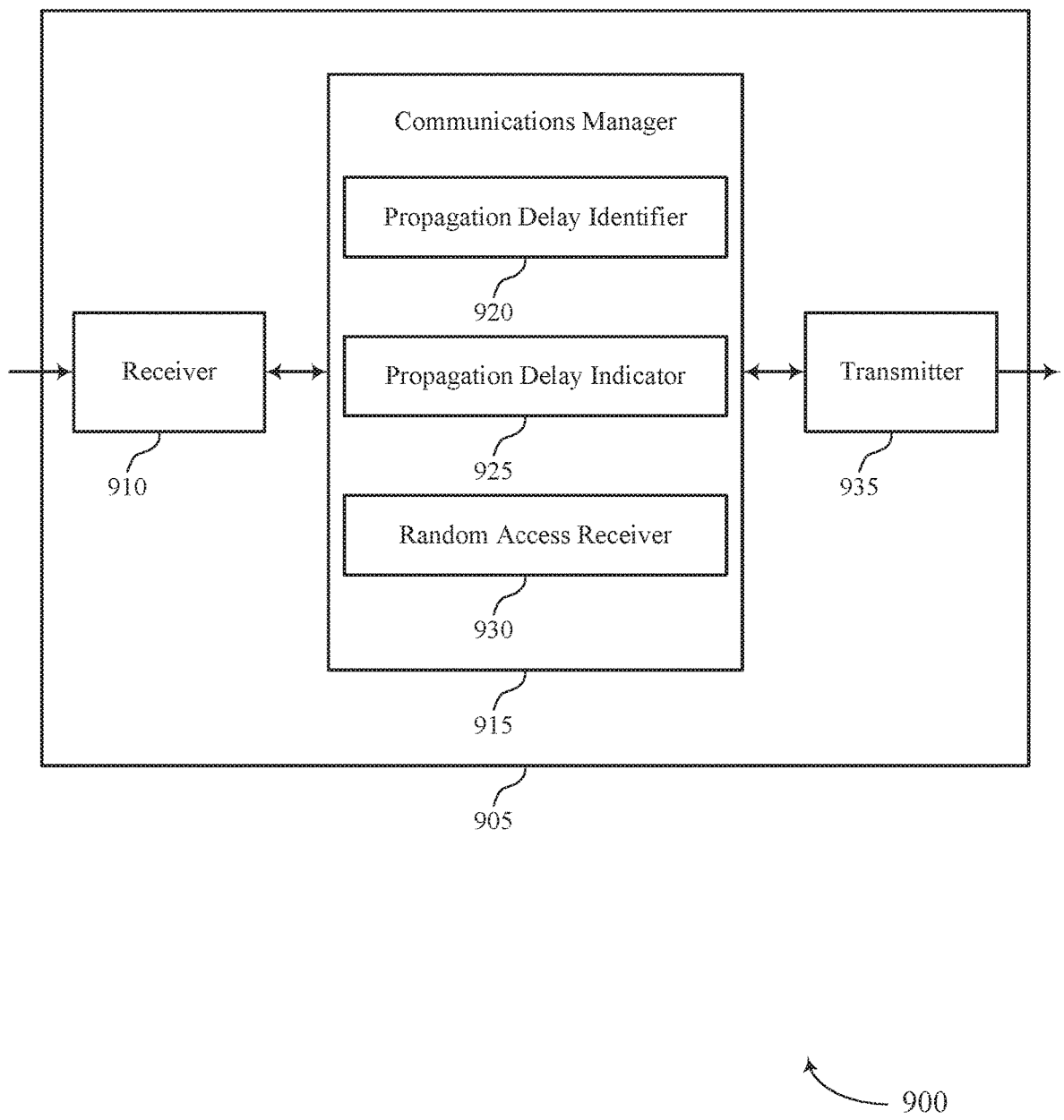

FIG. 9 shows a block diagram 900 of a device 905 in accordance with aspects of the present disclosure. The device 905 may be an example of aspects of a device 805 or a relay device such as a satellite 140 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for initial access in wireless systems). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a propagation delay identifier 920, a propagation delay indicator 925, and a random access receiver 930. The communications manager 915 may be an example of aspects of the communications manager 1110 described herein.

The propagation delay identifier 920 may identify propagation delay information associated with wireless communications between a gateway and a UE in an NTN, where the propagation delay information may be identified based on a distance between a satellite in communication with the gateway and the UE and a geographical area associated with a transmission beam from the satellite.

The propagation delay indicator 925 may transmit, to one or more devices of the NTN, an indication of the propagation delay information.

The random access receiver 930 may receive an initial access message from the UE, where the initial access message is time adjusted based on the propagation delay information.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
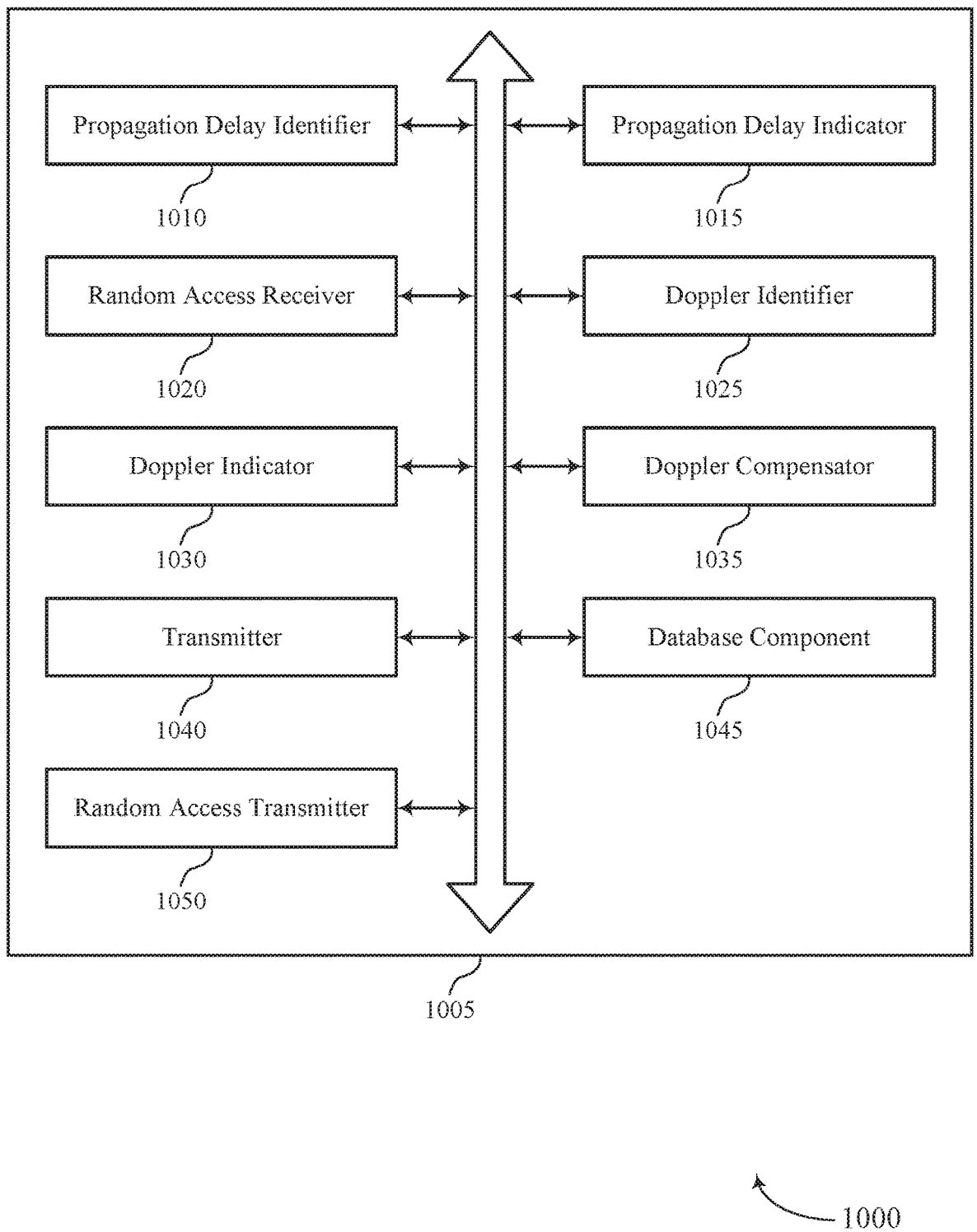

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a propagation delay identifier 1010, a propagation delay indicator 1015, a random access receiver 1020, a doppler identifier 1025, a doppler indicator 1030, a doppler compensator 1035, a transmitter 1040, a database component 1045, and a random access transmitter 1050. Each of these modules may communicate, directly or indirectly, with one another (e.g., via one or more buses).

The propagation delay identifier 1010 may identify propagation delay information associated with wireless communications between a gateway and a UE in an NTN, where the propagation delay information may be identified based on a distance between a satellite in communication with the gateway and the UE and a geographical area associated with a transmission beam from the satellite.

In some examples, the propagation delay identifier 1010 may determine the distance between the satellite and the geographical area associated with the transmission beam with respect to a center of the geographical area.

The propagation delay indicator 1015 may transmit, to one or more devices of the NTN, an indication of the propagation delay information. In some examples, the propagation delay indicator 1015 may periodically update the distance between the satellite and the geographical area associated with the transmission beam according to an updating periodicity, where the indication of the propagation delay information may be transmitted according to the updating periodicity.

In some examples, the propagation delay indicator 1015 may transmit at least one of a one way distance between the satellite and a center of the geographical area associated with the transmission beam, a round trip distance between the gateway and the satellite, an estimated round trip time between the UE and the gateway, an estimated round trip time between the satellite and the gateway, or a combination thereof.

The random access receiver 1020 may receive an initial access message from the UE, where the initial access message is time adjusted based on the propagation delay information.

The Doppler identifier 1025 may identify Doppler information associated with the satellite.

The Doppler indicator 1030 may transmit, by the satellite, an indication of the Doppler information, where the received initial access message is frequency adjusted based on the Doppler information.

In some examples, the Doppler indicator 1030 may transmit the indication of the Doppler information to a network node for maintaining a database of satellite information and transmission beam information associated with wireless communications via the satellite. In some cases, the Doppler indicator 1030 may transmit at least one of a velocity of the satellite, a difference between a transmission frequency used for transmitting the indication of the Doppler information and a nominal transmission frequency, or a combination thereof. In some cases, the indication of the Doppler information is conveyed via one or more SIBs.

The Doppler compensator 1035 may determine a transmission frequency based on the Doppler information.

The transmitter 1040 may transmit a downlink signal according to the transmission frequency, where the downlink signal includes the indication of the Doppler information.

The database component 1045 may broadcast, by the satellite, the database to a set of devices in the NTN.

The random access transmitter 1050 may transmit the initial access message to the gateway.

Figure 11:
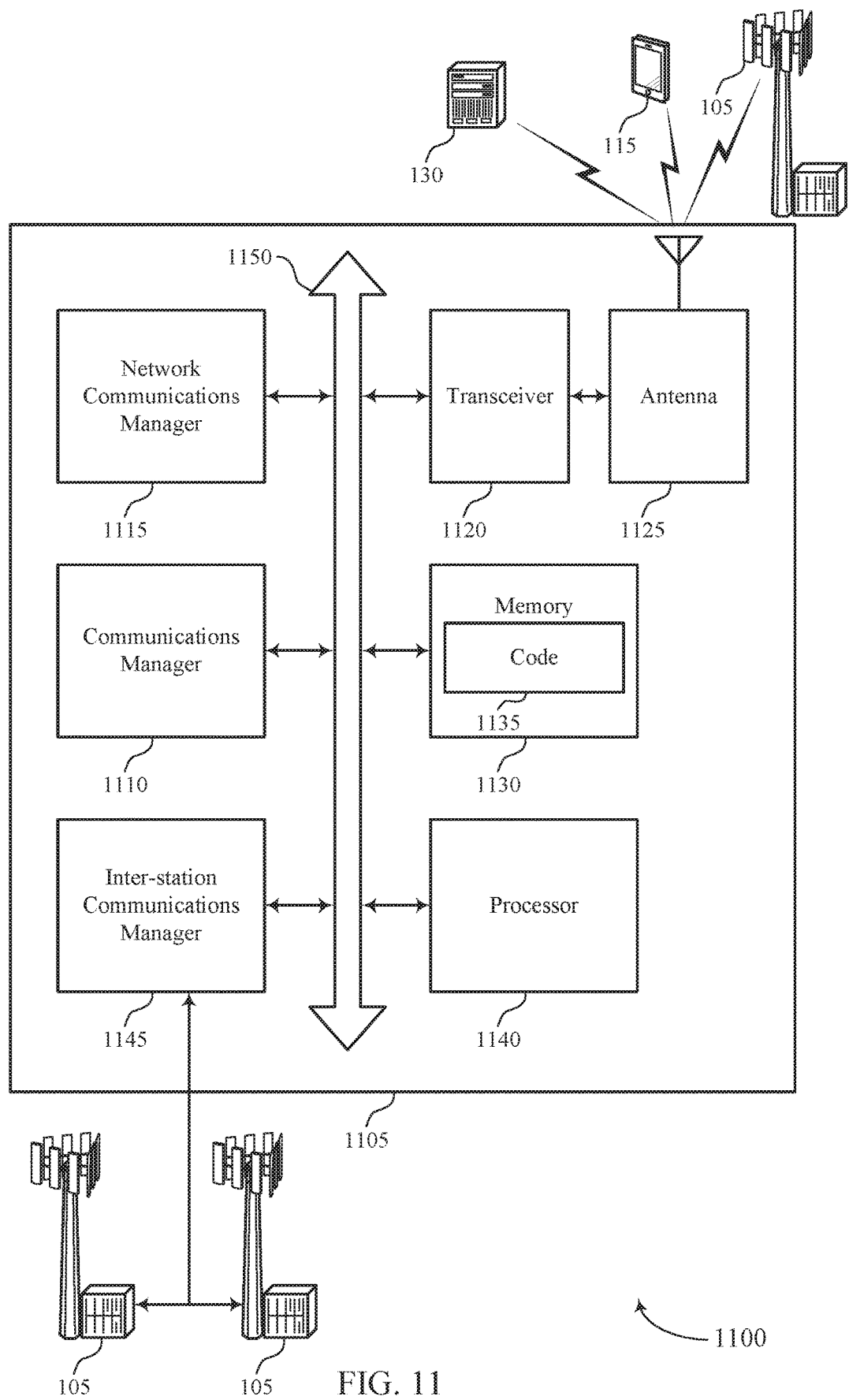
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of device 805, device 905, or a relay device such as a satellite 140 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify propagation delay information associated with wireless communications between a gateway and a UE in an NTN, where the propagation delay information may be identified based on a distance between a satellite in communication with the gateway and the UE and a geographical area associated with a transmission beam from the satellite. The communications manager 1110 may transmit, to one or more devices of the NTN, an indication of the propagation delay information. The communications manager 1110 may receive an initial access message from the UE, where the initial access message is time adjusted based on the propagation delay information.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for initial access in wireless systems).

The inter-station communications manager 1145 may manage communications with base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
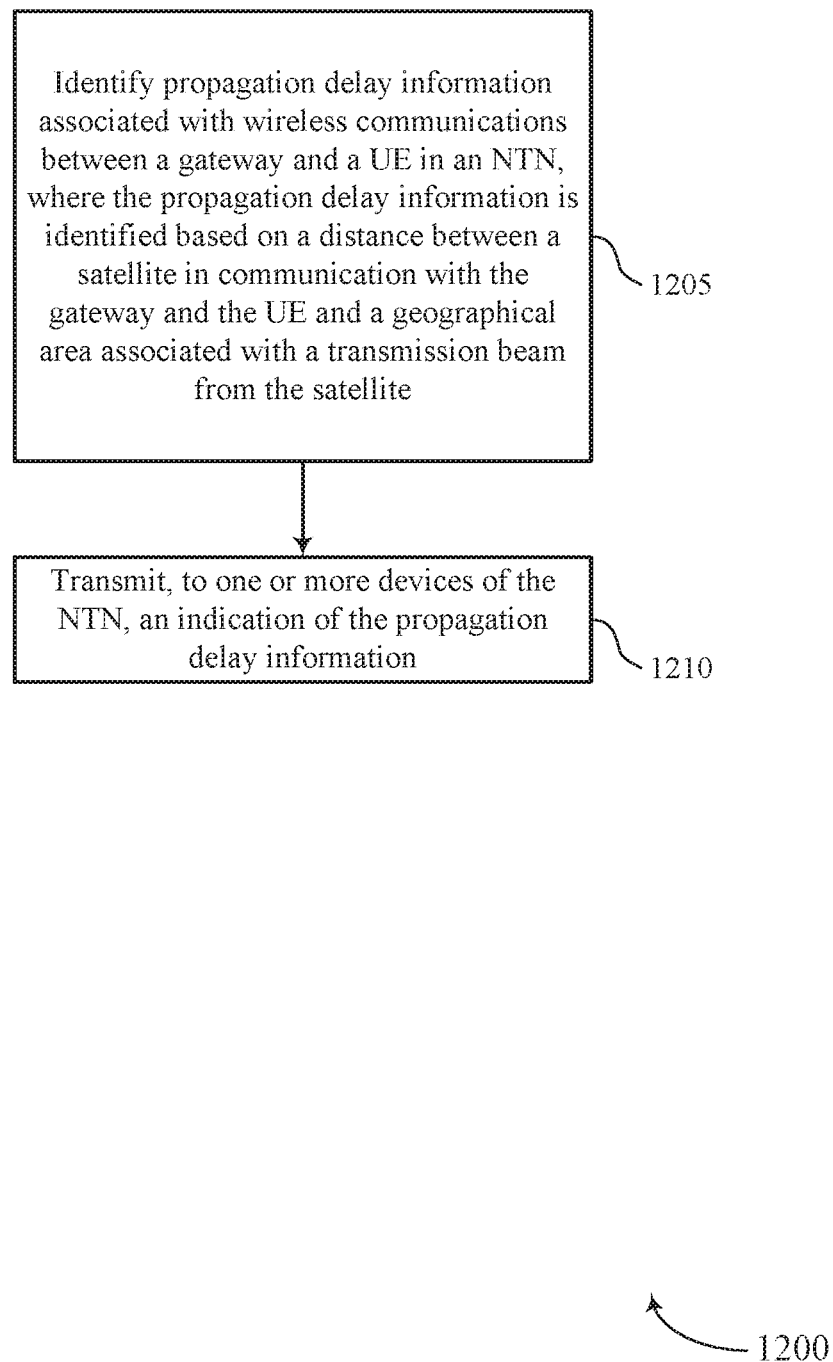
FIGS. 12 through 15 show flowcharts illustrating methods in accordance with aspects of the present disclosure.

FIG. 12 shows a flowchart illustrating a method 1200 in accordance with aspects of the present disclosure. The operations of method 1200 may be implemented by a relay device such as a satellite 140 or its components as described herein. For example, the operations of method 1200 may be performed by a communications manager as described with reference to FIGS. 8 to 11. In some examples, a satellite may execute a set of instructions to control the functional elements of the satellite to perform the functions described herein. Additionally or alternatively, a satellite may perform aspects of the functions described herein using special-purpose hardware.

At 1205, the satellite may identify propagation delay information associated with wireless communications between a gateway and a UE in an NTN, where the propagation delay information may be identified based on a distance between a satellite in communication with the gateway and the UE and a geographical area associated with a transmission beam from the satellite. The operations of 1205 may be performed according to the methods described herein. In some examples, aspects of the operations of 1205 may be performed by a propagation delay identifier as described with reference to FIGS. 8 to 11.

At 1210, the satellite may transmit, to one or more devices of the NTN, an indication of the propagation delay information. The operations of 1210 may be performed according to the methods described herein. In some examples, aspects of the operations of 1210 may be performed by a propagation delay indicator as described with reference to FIGS. 8 to 11.

Figure 13:
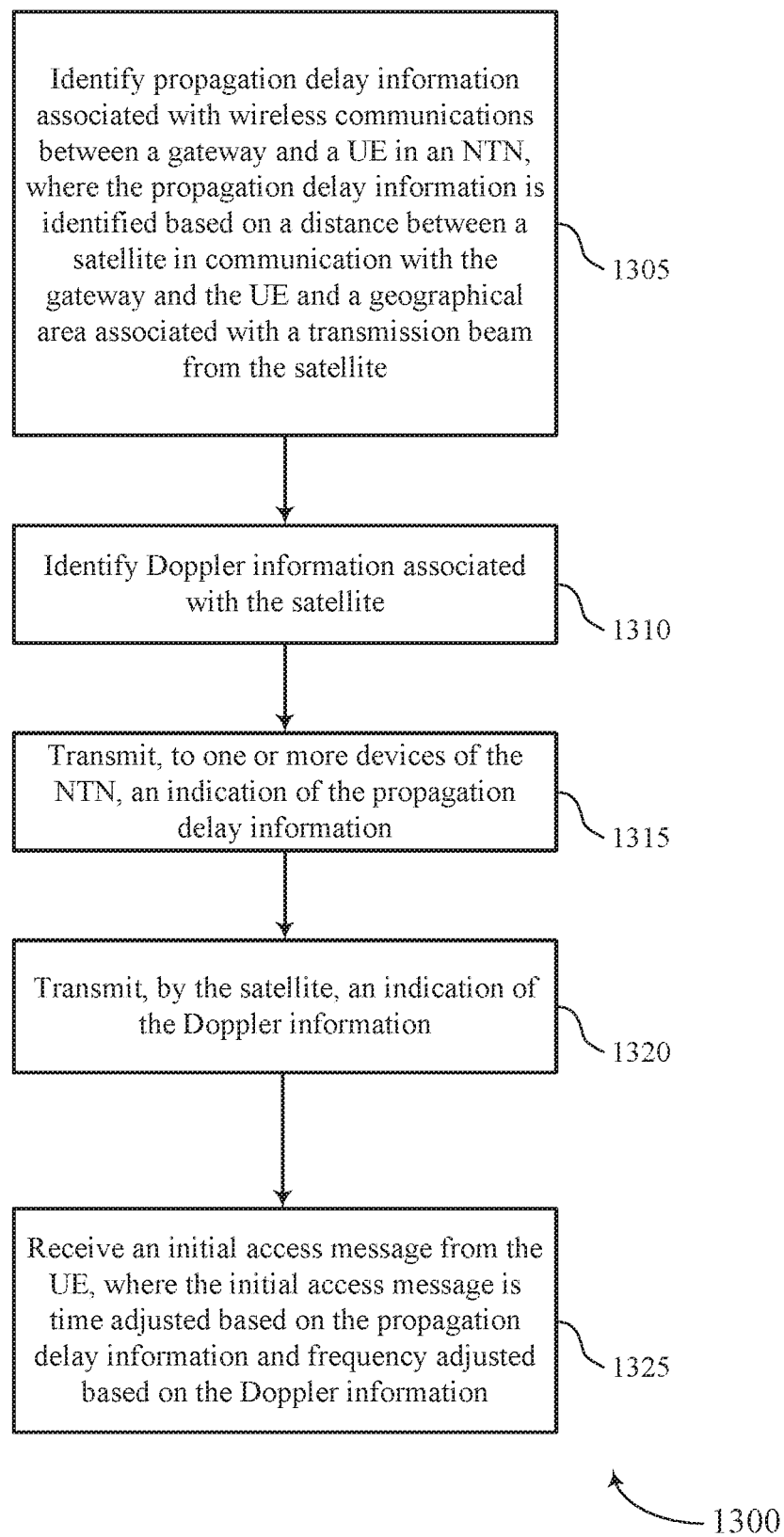

FIG. 13 shows a flowchart illustrating a method 1300 in accordance with aspects of the present disclosure. The operations of method 1300 may be implemented by a relay device such as a satellite 140 or its components as described herein. For example, the operations of method 1300 may be performed by a communications manager as described with reference to FIGS. 8 to 11. In some examples, a satellite may execute a set of instructions to control the functional elements of the satellite to perform the functions described herein. Additionally or alternatively, a satellite may perform aspects of the functions described herein using special-purpose hardware.

At 1305, the satellite may identify propagation delay information associated with wireless communications between a gateway and a UE in an NTN, where the propagation delay information may be identified based on a distance between a satellite in communication with the gateway and the UE and a geographical area associated with a transmission beam from the satellite. The operations of 1305 may be performed according to the methods described herein. In some examples, aspects of the operations of 1305 may be performed by a propagation delay identifier as described with reference to FIGS. 8 to 11.

At 1310, the satellite may identify Doppler information associated with the satellite. The operations of 1310 may be performed according to the methods described herein. In some examples, aspects of the operations of 1310 may be performed by a Doppler identifier as described with reference to FIGS. 8 to 11.

At 1315, the satellite may transmit, to one or more devices of the NTN, an indication of the propagation delay information. The operations of 1315 may be performed according to the methods described herein. In some examples, aspects of the operations of 1315 may be performed by a propagation delay indicator as described with reference to FIGS. 8 to 11.

At 1320, the satellite may transmit, by the satellite, an indication of the Doppler information, where the received initial access message is frequency adjusted based on the Doppler information. The operations of 1320 may be performed according to the methods described herein. In some examples, aspects of the operations of 1320 may be performed by a Doppler indicator as described with reference to FIGS. 8 to 11.

At 1325, the satellite may receive an initial access message from the UE, where the initial access message is time adjusted based on the propagation delay information. The operations of 1325 may be performed according to the methods described herein. In some examples, aspects of the operations of 1325 may be performed by an initial access receiver as described with reference to FIGS. 8 to 11.

Figure 14:
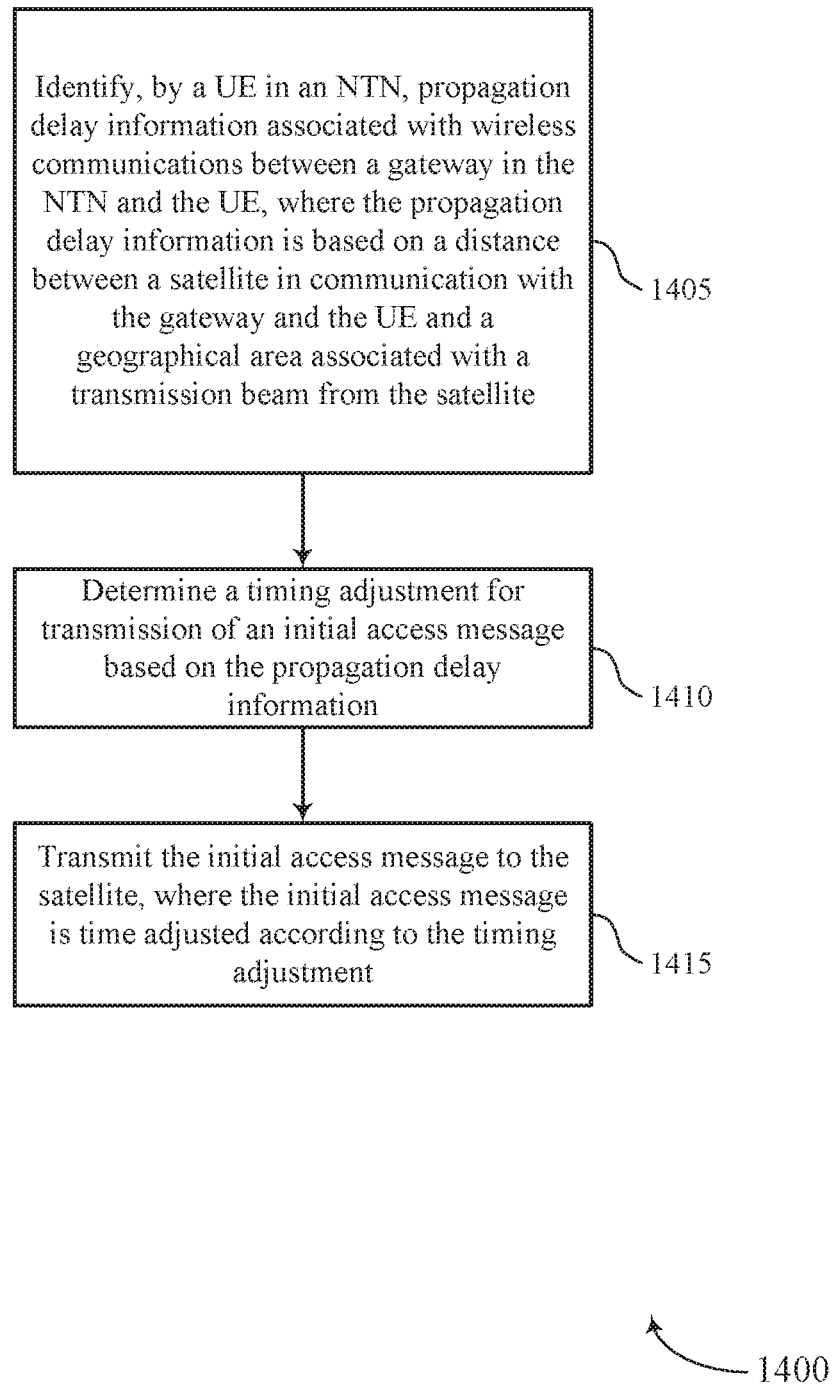

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 4 to 7. In some examples, a UE may execute a set of instructions to control the functional elements of the UE to perform the functions described herein. Additionally or alternatively, a UE may perform aspects of the functions described herein using special-purpose hardware.

At 1405, the UE may identify propagation delay information associated with wireless communications between a gateway in the NTN and the UE, where the propagation delay information may be based on a distance between a satellite in communication with the gateway and the UE and a geographical area associated with a transmission beam from the satellite. The operations of 1405 may be performed according to the methods described herein. In some examples, aspects of the operations of 1405 may be performed by a propagation delay identifier as described with reference to FIGS. 4 to 7.

At 1410, the UE may determine a timing adjustment for transmission of an initial access message based on the propagation delay information. The operations of 1410 may be performed according to the methods described herein. In some examples, aspects of the operations of 1410 may be performed by a timing adjuster as described with reference to FIGS. 4 to 7.

At 1415, the UE may transmit the initial access message to the satellite, where the initial access message is time adjusted according to the timing adjustment. The operations of 1415 may be performed according to the methods described herein. In some examples, aspects of the operations of 1415 may be performed by an initial access transmitter as described with reference to FIGS. 4 to 7.

Figure 15:
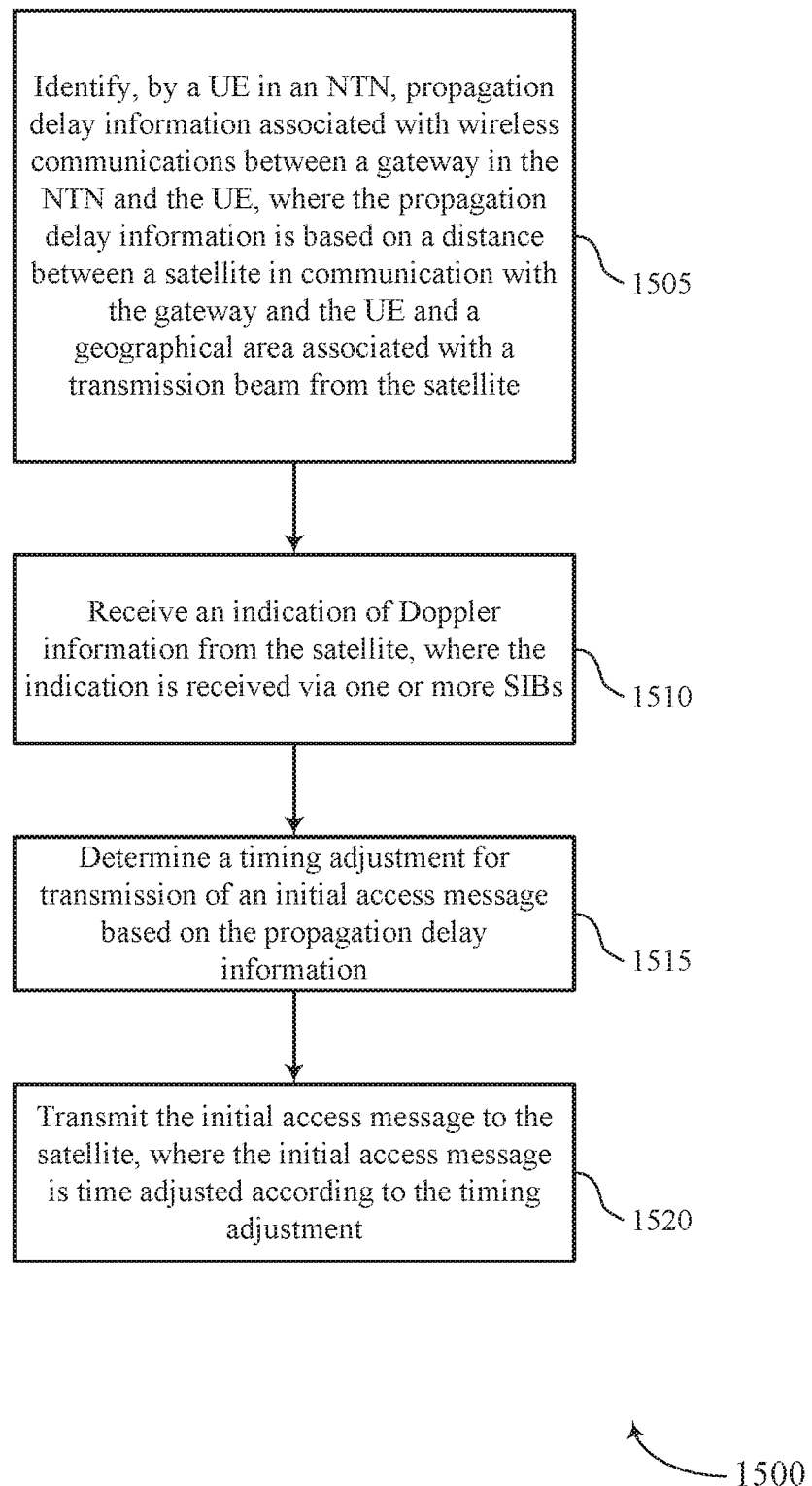

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 4 to 7. In some examples, a UE may execute a set of instructions to control the functional elements of the UE to perform the functions described herein. Additionally or alternatively, a UE may perform aspects of the functions described herein using special-purpose hardware.

At 1505, the UE may identify propagation delay information associated with wireless communications between a gateway in the NTN and the UE, where the propagation delay information may be based on a distance between a satellite in communication with the gateway and the UE and a geographical area associated with a transmission beam from the satellite. The operations of 1505 may be performed according to the methods described herein. In some examples, aspects of the operations of 1505 may be performed by a propagation delay identifier as described with reference to FIGS. 4 to 7.

At 1510, the UE may receive an indication of Doppler information from the satellite, where the indication is received via one or more SIBs. The operations of 1510 may be performed according to the methods described herein. In some examples, aspects of the operations of 1510 may be performed by a Doppler receiver as described with reference to FIGS. 4 to 7.

At 1515, the UE may determine a timing adjustment for transmission of an initial access message based on the propagation delay information. The operations of 1515 may be performed according to the methods described herein. In some examples, aspects of the operations of 1515 may be performed by a timing adjuster as described with reference to FIGS. 4 to 7.

At 1520, the UE may transmit the initial access message to the satellite, where the initial access message is time adjusted according to the timing adjustment. The operations of 1520 may be performed according to the methods described herein. In some examples, aspects of the operations of 1520 may be performed by an initial access transmitter as described with reference to FIGS. 4 to 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying propagation delay information associated with wireless communications between a gateway and a user equipment (UE) in a non-terrestrial network (NTN), wherein the propagation delay information is identified based at least in part on a distance between a satellite in communication with the gateway and the UE and a geographical area associated with a transmission beam from the satellite;

identifying Doppler information associated with the satellite;

identifying a transmission frequency based at least in part on the Doppler information; and transmitting, to one or more devices of the NTN, a downlink signal according to the transmission frequency, wherein the downlink signal comprises an indication of the propagation delay information and an indication of the Doppler information.

2. The method of claim 1, further comprising:

receiving an initial access message from the UE, wherein the initial access message is time adjusted based at least in part on the propagation delay information.

3. The method of claim 2, wherein the received initial access message is frequency adjusted based at least in part on the Doppler information.

4. The method of claim 3, further comprising:

transmitting the indication of the Doppler information to a network node for maintaining a database of satellite information and transmission beam information associated with wireless communications via the satellite.

5. The method of claim 4, further comprising:

broadcasting, by the satellite, the database to a set of devices in the NTN.

6. The method of claim 3, wherein transmitting the indication of the Doppler information comprises:

transmitting at least one of a velocity of the satellite, a difference between a transmission frequency used for transmitting the indication of the Doppler information and a nominal transmission frequency, or a combination thereof.

7. The method of claim 6, wherein the indication of the Doppler information is conveyed via one or more system information blocks (SIBs).

8. The method of claim 2, further comprising:

transmitting the initial access message to the gateway.

9. The method of claim 1, further comprising:

determining the distance between the satellite and the geographical area associated with the transmission beam with respect to a center of the geographical area.

10. The method of claim 1, further comprising:

periodically updating the distance between the satellite and the geographical area associated with the transmission beam according to an updating periodicity, wherein the indication of the propagation delay information is transmitted according to the updating periodicity.

11. The method of claim 1, wherein transmitting the indication of the propagation delay information comprises:

transmitting at least one of a one way distance between the satellite and a center of the geographical area associated with the transmission beam, a round trip distance between the gateway and the satellite, an estimated round trip time between the UE and the gateway, an estimated round trip time between the satellite and the gateway, or a combination thereof.

12. A method for wireless communications, comprising:

identifying, by a user equipment (UE) in a non-terrestrial network (NTN), propagation delay information associated with wireless communications between a gateway in the NTN and the UE, wherein the propagation delay information is based at least in part on a distance between a satellite in communication with the gateway and the UE and a geographical area associated with a transmission beam from the satellite;

receiving an indication of Doppler information from the satellite via one or more system information blocks (SIBs);

determining a timing adjustment for transmission of an initial access message based at least in part on the propagation delay information; and transmitting the initial access message to the satellite based at least in part on receiving the indication of Doppler information, wherein the initial access message is time adjusted according to the timing adjustment.

13. The method of claim 12, wherein identifying the propagation delay information comprises:

accessing a database of satellite information and transmission information based at least in part on a cell identifier (ID) of the satellite, wherein the cell ID corresponds to the transmission beam.

14. The method of claim 13, further comprising:

receiving an indicator of the cell ID from the satellite.

15. The method of claim 13, further comprising:

receiving a broadcast message from the satellite or a network node of the NTN, wherein the broadcast message comprises the database.

16. The method of claim 13, wherein the satellite information comprises at least one of a one way distance between the satellite and a center of the geographical area associated with the transmission beam, a round trip distance between the gateway and the satellite, an estimated round trip time between the UE and the gateway, an estimated round trip time between the satellite and the gateway, or a combination thereof.

17. The method of claim 12, wherein the Doppler information comprises at least one of a velocity of the satellite, a difference between a transmission frequency used for transmitting the indication of the Doppler information and a nominal transmission frequency, or a combination thereof.

18. The method of claim 12, wherein determining the timing adjustment comprises:

performing synchronization with a downlink signal that comprises the indication of the Doppler information.

19. The method of claim 12, further comprising:

receiving, from the gateway, an initial access response message via the satellite in response to the initial access message.

20. An apparatus for wireless communications, comprising:

a processor, memory in electronic communication with the processor; and instructions stored in the memory and executable by the processor to cause the apparatus to:

identify propagation delay information associated with wireless communications between a gateway and a user equipment (UE) in a non-terrestrial network (NTN), wherein the propagation delay information is identified based at least in part on a distance between a satellite in communication with the gateway and the UE and a geographical area associated with a transmission beam from the satellite;

identify Doppler information associated with the satellite;

identify a transmission frequency based at least in part on the Doppler information; and transmit, to one or more devices of the NTN, a downlink signal according to the transmission frequency, wherein the downlink signal comprises an indication of the propagation delay information and an indication of the Doppler information.

21. The apparatus of claim 20, wherein the instructions are further executable by the processor to cause the apparatus to:
receive an initial access message from the UE, wherein the initial access message is time adjusted based at least in part on the propagation delay information.

22. The apparatus of claim 20, wherein the instructions are further executable by the processor to cause the apparatus to:
determine the distance between the satellite and the geographical area associated with the transmission beam with respect to a center of the geographical area.

23. The apparatus of claim 20, wherein the instructions are further executable by the processor to cause the apparatus to:
periodically update the distance between the satellite and the geographical area associated with the transmission beam according to an updating periodicity, wherein the indication of the propagation delay information is transmitted according to the updating periodicity.

24. An apparatus for wireless communications, comprising:
a processor,
memory in electronic communication with the processor; and
instructions stored in the memory and executable by the processor to cause the apparatus to:
identify, by a user equipment (UE) in a non-terrestrial network (NTN), propagation delay information associated with wireless communications between a gateway in the NTN and the UE, wherein the propagation delay information is based at least in part on a distance between a satellite in communication with the gateway and the UE and a geographical area associated with a transmission beam from the satellite;
receive an indication of Doppler information from the satellite via one or more system information blocks (SIBs);
determine a timing adjustment for transmission of an initial access message based at least in part on the propagation delay information; and
transmit the initial access message to the satellite based at least in part on receiving the indication of Doppler information, wherein the initial access message is time adjusted according to the timing adjustment.

25. The apparatus of claim 24, wherein the instructions to identify the propagation delay information are executable by the processor to cause the apparatus to:
access a database of satellite information and transmission information based at least in part on a cell identifier (ID) of the satellite, wherein the cell ID corresponds to the transmission beam.

26. The apparatus of claim 25, wherein the instructions are further executable by the processor to cause the apparatus to:
receive, by a receiver, an indicator of the cell ID from the satellite.

27. The apparatus of claim 25, wherein the instructions are further executable by the processor to cause the apparatus to:
receive, by a receiver, a broadcast message from the satellite or a network node of the NTN, wherein the broadcast message comprises the database.

* * * * *